US012806922B2

(12) United States Patent
Maeno

(10) Patent No.: US 12,806,922 B2
(45) Date of Patent: Nov. 24, 2026

(54) CUTTING DEVICE INCLUDING BLADE RECEIVER, CUTTING BLADE, SUPPORT MEMBER SUPPORTING CUTTING BLADE, AND PATH-FORMING PART FORMING CONVEYING PATH OF TAPE

(71) Applicant: BROTHER KOGYO KABUSHIKI KAISHA, Nagoya (JP)

(72) Inventor: Narumi Maeno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 56 days.

(21) Appl. No.: 18/899,587

(22) Filed: Sep. 27, 2024

(65) Prior Publication Data

US 2025/0108638 A1 Apr. 3, 2025

(30) Foreign Application Priority Data

Sep. 28, 2023 (JP) ................................ 2023-166679

(51) Int. Cl.
*B41J 11/70* (2006.01)
*B41J 3/407* (2006.01)

(52) U.S. Cl.
CPC ........... *B41J 11/703* (2013.01); *B41J 3/4075* (2013.01)

(58) Field of Classification Search
CPC ...................................................... B41J 11/703
See application file for complete search history.

(56) References Cited

U.S. PATENT DOCUMENTS

| | | | | |
|---|---|---|---|---|
| 8,393,811 B2 * | 3/2013 | Jo | .......................... | B41J 11/703 400/621 |
| 2013/0287467 A1 * | 10/2013 | Takahashi | ................ | B26D 3/12 400/621 |

FOREIGN PATENT DOCUMENTS

JP 2013-136219 A 7/2013

* cited by examiner

*Primary Examiner* — Christle I Marshall
(74) *Attorney, Agent, or Firm* — Kenealy Vaidya LLP

(57) ABSTRACT

A cutting device includes: a blade receiver having a first receiving surface; a cutting blade configured to cut a tape conveyed in a conveying direction; a support member; and a path-forming part. The path-forming part has a first end which is both an upstream end in the conveying direction and an end in a first direction. The first receiving surface has a second end which is a downstream end in the conveying direction. The support member has a third end which is an end in a second direction. The cutting blade is positioned further upstream in the conveying direction relative to an intersection point at which a first virtual line passing through both the first end and the second end and a second virtual line parallel to the conveying direction and passing through the third end intersect when viewed in a direction orthogonal to the first direction.

8 Claims, 16 Drawing Sheets

CUTTING DEVICE INCLUDING BLADE RECEIVER, CUTTING BLADE, SUPPORT MEMBER SUPPORTING CUTTING BLADE, AND PATH-FORMING PART FORMING CONVEYING PATH OF TAPE

REFERENCE TO RELATED APPLICATIONS

This application claims priority from Japanese Patent Application No. 2023-166679 filed on Sep. 28, 2023. The entire content of the priority application is incorporated herein by reference.

BACKGROUND ART

There has been known a conventional tape printing device including a main frame made of resin, a mounting part, a cutting blade configured to cut tape, and a cutting blade receiving member configured to contact the cutting blade during cutting operation of the tape. The mounting part is provided in the main frame, and includes a hook member and ribs. The hook member restrains movement of the cutting blade receiving member. The ribs contact a side wall of the cutting blade receiving member when the cutting blade receiving member is mounted on the mounting part. The cutting blade receiving member is removably mounted on the mounting part through the hook member and the ribs.

SUMMARY

When conveyed along a conveying path, the tape may curl into an arc shape due to having been wound into a roll. In the conventional tape printing device, the leading end of the curled tape might inadvertently get caught in a gap between the tape conveying path and the cutting blade receiving member.

In view of the foregoing, it is an object of the present disclosure to provide a cutting device and a printing device that reduce the likelihood of a leading end of tape entering between a tape conveying path and a cutting blade receiving member, even when the tape has curled into an arc shape.

In order to attain the above and other objects, according to one aspect, the present disclosure provides a cutting device including: a blade receiver; a cutting blade; a support member; and a path-forming part. The blade receiver has a first receiving surface. The cutting blade is movable between: a cutting position in which the cutting blade cuts, at a position between the cutting blade and the first receiving surface, a tape conveyed in a conveying direction along the first receiving surface; and a normal position in which the cutting blade is in separation from the first receiving surface. The support member supports the cutting blade so that the cutting blade is movable between the cutting position and the normal position. The path-forming part is adjacent to the support member and is positioned further downstream in the conveying direction relative to the support member. The path-forming part forms a conveying path of the tape. The path-forming part has a first end. The first end is both an upstream end in the conveying direction of the path-forming part and an end in a first direction of the path-forming part. The first direction is a direction from the blade receiver toward the cutting blade. The first direction is orthogonal to the first receiving surface. The first receiving surface has a second end. The second end is a downstream end in the conveying direction of the first receiving surface. The support member has a third end. The third end is an end in a second direction of the support member. The second direction is opposite the first direction. The cutting blade is positioned further upstream in the conveying direction relative to an intersection point at which a first virtual line and a second virtual line intersect when viewed in a direction orthogonal to the first direction. The first virtual line passes through both the first end of the path-forming part and the second end of the first receiving surface. The second virtual line is parallel to the conveying direction and passes through the third end of the support member.

In the above structure, the blade receiver and the path-forming part are provided such that the cutting blade is positioned further upstream in the conveying direction relative to the intersection point at which the first virtual line and the second virtual line intersect when viewed in the direction orthogonal to the first direction. With this positional relationship, the tape conveyed along the conveying direction can be restrained from entering a gap between the blade receiver and the path-forming part in comparison with a configuration in which the cutting blade is positioned further downstream in the conveying direction relative to the intersection point.

According to another aspect, the present disclosure also provides a printing device including: a printing head; a conveying unit; and a cutting device. The printing head is configured to perform printing on a tape. The conveying unit is configured to convey the tape in a conveying direction. The cutting device is configured to cut the tape. the cutting device includes: a blade receiver; a cutting blade; a support member; and a path-forming part. The blade receiver has a first receiving surface. The cutting blade is movable between: a cutting position in which the cutting blade cuts, at a position between the cutting blade and the first receiving surface, the tape conveyed in the conveying direction along the first receiving surface; and a normal position in which the cutting blade is in separation from the first receiving surface. The support member supports the cutting blade so that the cutting blade is movable between the cutting position and the normal position. The path-forming part is adjacent to the support member and is positioned further downstream in the conveying direction relative to the support member. The path-forming part forms a conveying path of the tape. The path-forming part has a first end. The first end is both an upstream end in the conveying direction of the path-forming part and an end in a first direction of the path-forming part. The first direction is a direction from the blade receiver toward the cutting blade. The first direction is orthogonal to the first receiving surface. The first receiving surface has a second end. The second end is a downstream end in the conveying direction of the first receiving surface. The support member has a third end. The third end is an end in a second direction of the support member. The second direction is opposite the first direction. The cutting blade is positioned further upstream in the conveying direction relative to an intersection point at which a first virtual line and a second virtual line intersect when viewed in a direction orthogonal to the first direction. The first virtual line passes through both the first end of the path-forming part and the second end of the first receiving surface. The second virtual line is parallel to the conveying direction and passes through the third end of the support member.

Also in the above structure, the blade receiver and the path-forming part in the cutting device are provided such that the cutting blade is positioned further upstream in the conveying direction relative to the intersection point at which the first virtual line and the second virtual line intersect when viewed in the direction orthogonal to the first direction. Accordingly, the printing device according to the other aspect that includes the cutting device can exhibit the technical advantages that can be obtained by the cutting device according to the aspect.

DESCRIPTION

Hereinafter, a printing device 1 according to one embodiment of the present disclosure will be described while referring to the accompanying drawings.

Figure 1:
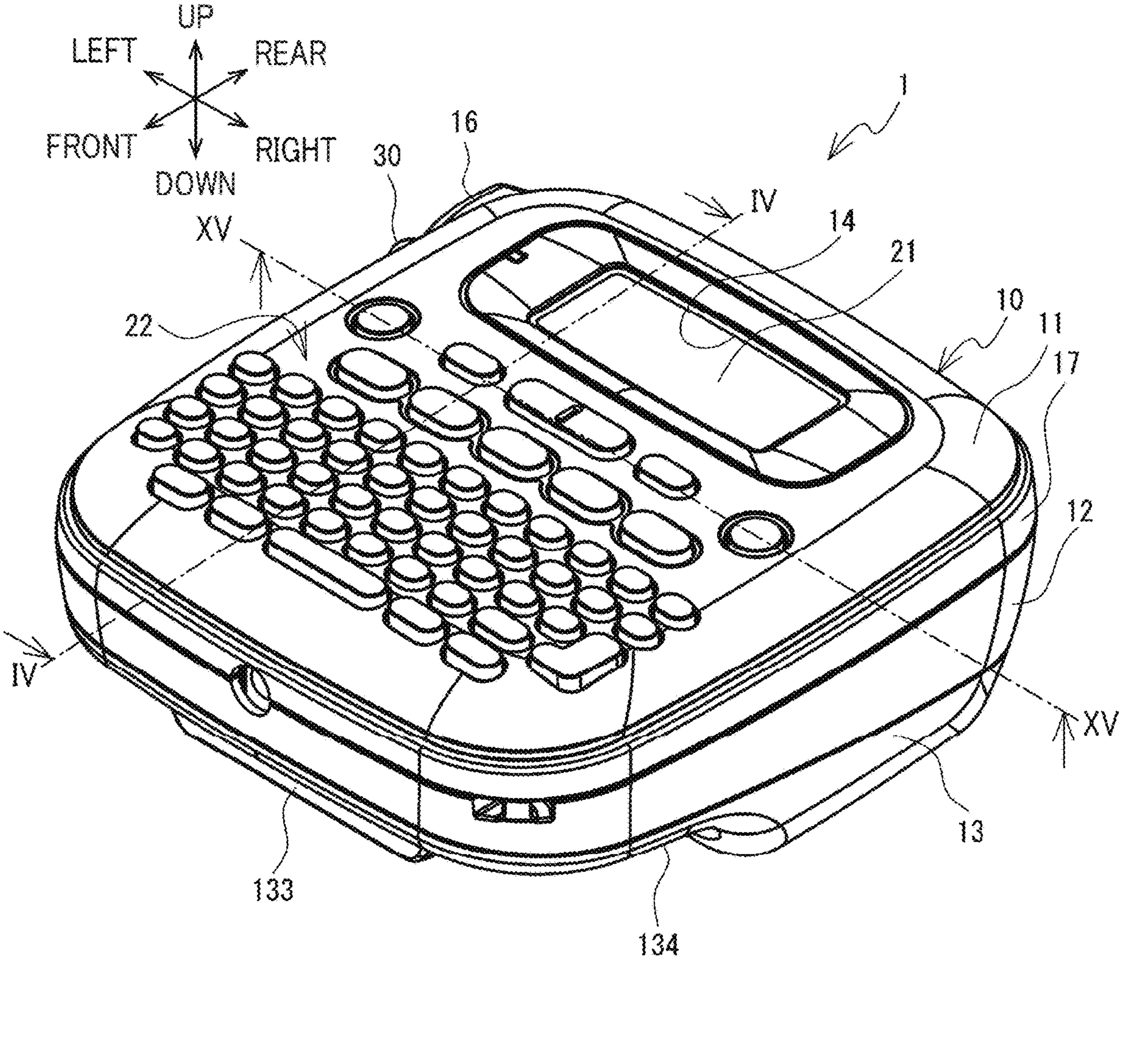
FIG. 1 is a perspective view of a printing device 1.

The upper side, the lower side, the upper-left side, the lower-right side, the lower-left side, and the upper-right side in FIG. 1 correspond to "upward direction", "downward direction", "leftward direction", "rightward direction", "frontward direction", and "rearward direction" of the printing device 1, respectively. Specifically, the terms "up", "down", "left", "right", "front", and "rear" in the drawings correspond to the upward direction, the downward direction, the leftward direction, the rightward direction, the frontward direction, and the rearward direction of the printing device 1, respectively.

The upward direction and the downward direction will be collectively referred to as "up-down direction", the leftward direction and the rightward direction will be collectively referred to as "left-right direction", and the frontward direction and the rearward direction will be collectively referred to as "front-rear direction". However, the up-down direction, the left-right direction, and the front-rear direction of the printing device 1 are defined merely for convenience, and these directions are not intended to limit the orientation of the printing device 1 to that illustrated in FIG. 1.

As illustrated in FIG. 1, the printing device 1 is a label printer. The printing device 1 is configured to create labels by printing images on a tape M (see FIG. 15) drawn out from a printing cassette C (see FIGS. 4A to 4C). The printing device 1 includes a display unit 21, an input unit 22, and a housing 10.

The display unit 21 is a liquid crystal display elongated in the left-right direction, for example, and is configured to display thereon various information. The display unit 21 is provided on an upper surface of the housing 10 at a position further rearward relative to an approximate center in the front-rear direction of the upper surface. The input unit 22 is configured to receive various information inputted through user operations. The input unit 22 is disposed on the upper surface of the housing 10 at a position further frontward relative to the display unit 21. The input unit 22 includes a plurality of switches, such as a Print button, a Shift key, and an Esc key.

Figure 2:
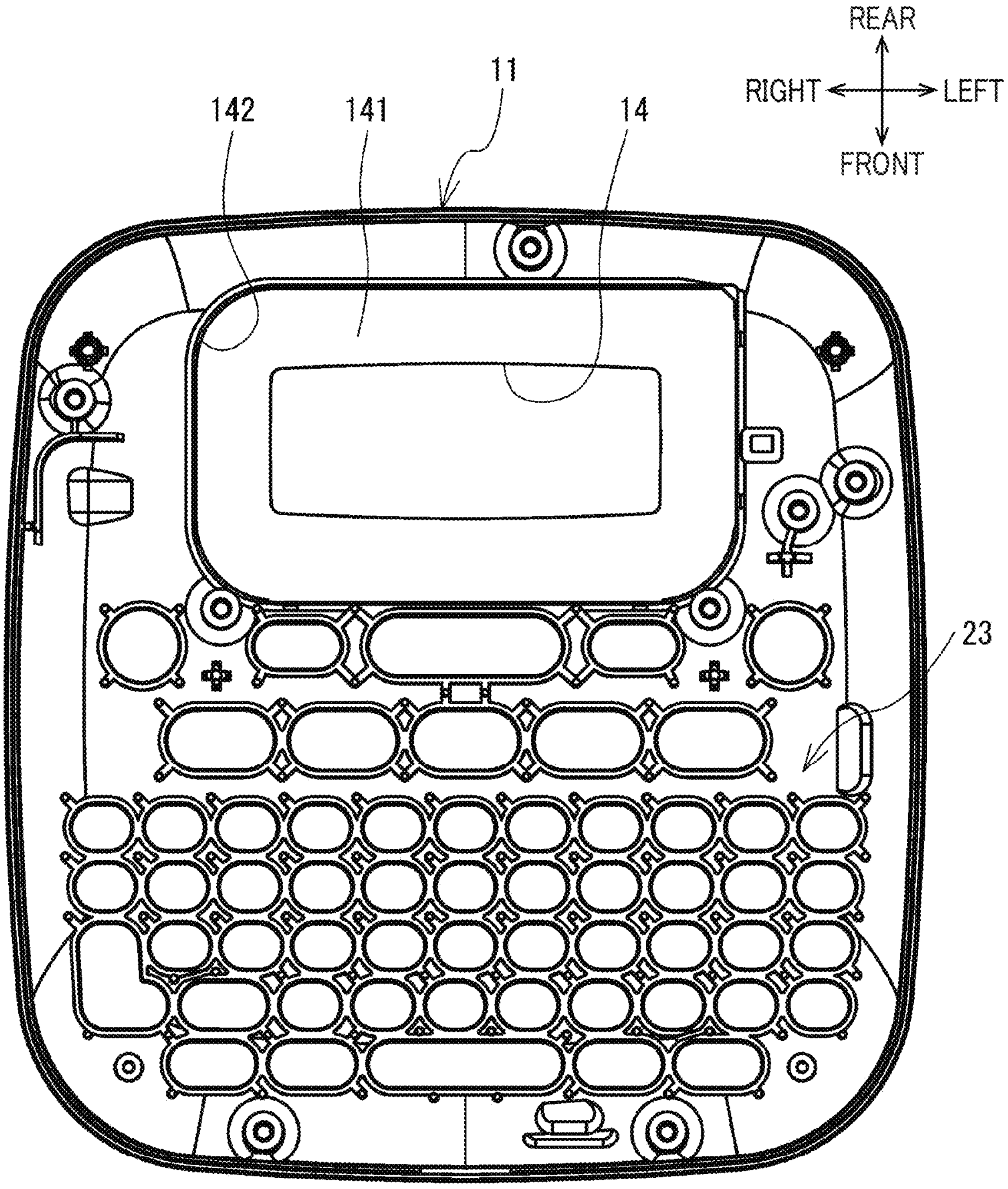
FIG. 2 is a bottom view of an upper cover 11.

The housing 10 includes an upper cover 11, a middle cover 17, a lower cover 13, a lever accommodating part 30, and a main body part 12. The upper cover 11 is detachably attached to the middle cover 17 from above. As illustrated in FIG. 2, the upper cover 11 is formed in a square shape whose corner portions are rounded in a plan view. The upper cover 11 is formed with a hole 14, and includes an insertion part 23, a pressing part 141, and an attachment frame 142. The hole 14 has a rectangular shape that is elongated in the left-right direction. The hole 14 is formed in a rear portion of the upper cover 11. The insertion part 23 is formed with holes in which the switches of the input unit 22 are respectively inserted. The insertion part 23 is provided at a position frontward of the hole 14.

The pressing part 141 is an area for contacting the display unit 21 so that the display unit 21 is sandwiched between the upper cover 11 and the middle cover 17 in the up-down direction. The attachment frame 142 is a frame-like member having a rectangular shape whose corner portions are rounded in a bottom view. The attachment frame 142 protrudes downward from a lower surface of the upper cover 11. The display unit 21 is arranged inside the attachment frame 142 while a display surface 210 (see FIG. 4A) of the display unit 21 faces upward. The pressing part 141 is a part between the hole 14 and the attachment frame 142. The pressing part 141 contacts an upper surface of the display unit 21 and presses an outer edge portion of the display unit 21 toward the middle cover 17, i.e., downward.

Figure 3:
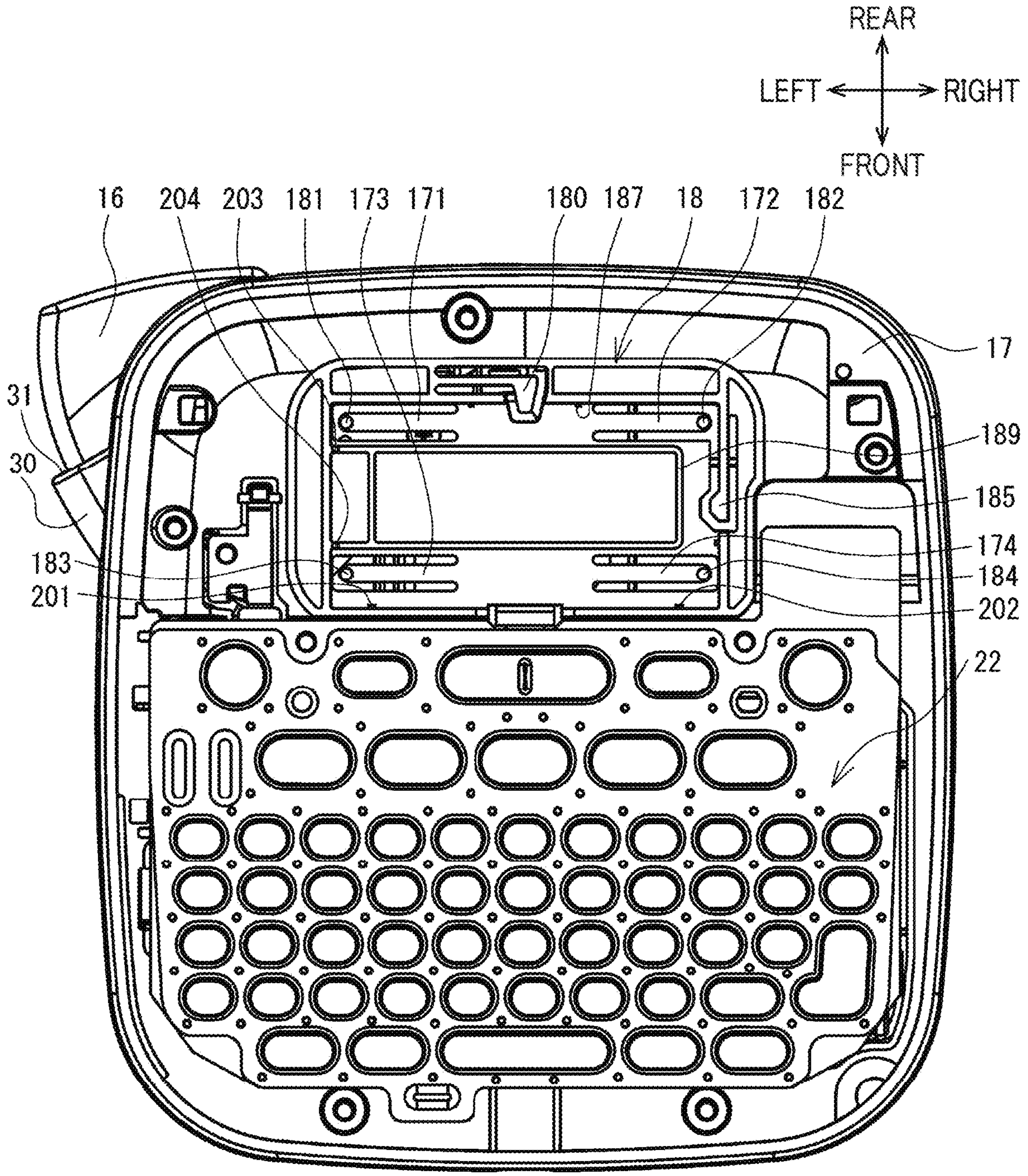
FIG. 3 is a plan view of the printing device 1 from which the upper cover 11 has been removed.

As illustrated in FIG. 3, the middle cover 17 has a rectangular plate shape, and is provided downward of the upper cover 11 and upward of the main body part 12. The middle cover 17 includes an attachment part 18, and the input unit 22. The attachment part 18 is formed of flexible resin. The attachment part 18 is a part disposed at a position rearward of the input unit 22 for receiving the display unit 21. The attachment part 18 includes a recess 187, a contact part 189, legs 171 to 174, pressing parts 180 and 185, and protrusions 201 to 204. The recess 187 has a rectangular shape in a plan view, and is recessed downward. The contact part 189 has a rectangular frame shape in a plan view, and protrudes upward from a center of the recess 187.

Each of the legs 171 and 173 has a plate shape that extends leftward from a center portion in the left-right direction of the middle cover 17. The leg 171 is disposed at a position rearward of the contact part 189, while the leg 173 is disposed at a position frontward of the contact part 189. The leg 171 has a left end portion at which a protrusion 181 is provided. The protrusion 181 protrudes upward from the left end portion of the leg 171. The leg 173 has a left end portion at which a protrusion 183 is provided. The protrusion 183 protrudes upward from the left end portion of the leg 173.

Figures 4A, 4B, 4C:
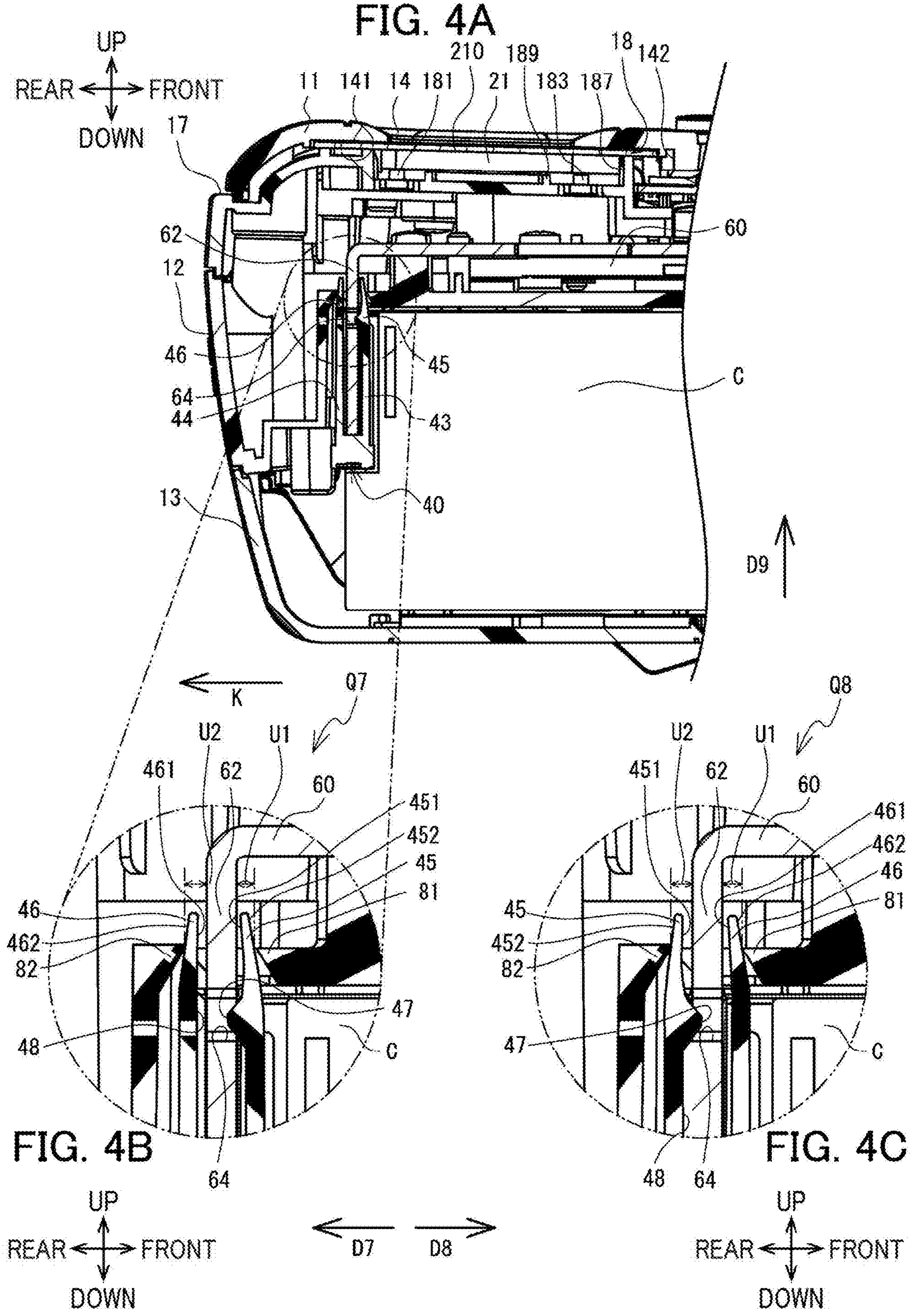
FIG. 4A is a cross-sectional view taken along line IV-IV in FIG. 1.
FIG. 4B is a partial enlarged view of FIG. 4A, and illustrating a state Q7 in which a blade receiver 40 has been mounted in its first posture.
FIG. 4C is another partial enlarged view of FIG. 4A, and illustrating a state Q8 in which the blade receiver 40 has been mounted in its second posture.

Each of the legs 172 and 174 has a plate shape that extends rightward from the center portion in the left-right direction of the middle cover 17. The leg 172 is disposed at a position rearward of the contact part 189, while the leg 174 is disposed at a position frontward of the contact part 189. The leg 172 has a right end portion at which a protrusion 182 is provided. The protrusion 182 protrudes upward from the right end portion of the leg 172. The leg 174 has a right end portion at which a protrusion 184 is provided. The protrusion 184 protrudes upward from the right end portion of the leg 174. As illustrated in FIG. 4A, an upper edge of the contact part 189 and upper edges of the protrusions 181 to 184 are positioned lower than an upper edge of the recess 187.

As illustrated in FIG. 3, the pressing part 180 extends rightward from a left portion of the attachment part 18 at a position rearward of the recess 187. The pressing part 180 has a right end portion positioned in a center in the left-right direction of the recess 187 and protrudes frontward into the recess 187. The pressing part 185 extends frontward from a rear portion of the attachment part 18 at a position rightward of the recess 187. The pressing part 185 has a front end portion positioned in a center in the front-rear direction of the recess 187. The front end portion of the pressing part 185 protrudes leftward into the recess 187.

Each of the protrusions 201 and 202 protrudes rearward from a front wall defining the recess 187. The protrusion 201 is positioned further leftward relative to the center in the left-right direction of the recess 187, and the protrusion 202 is positioned further rightward relative to the center in the left-right direction of the recess 187. Each of the protrusions 203 and 204 protrudes rightward from a left wall defining the recess 187. The protrusion 203 is positioned further rearward relative the center in the front-rear direction of the recess 187, and the protrusion 204 is positioned further frontward relative to the center in the front-rear direction of the recess 187.

In order to attach the display unit 21 to the attachment part 18, the display unit 21 is placed in the recess 187 with the display surface 210 facing upward while the upper cover 11 is removed from the middle cover 17. Each of the protrusions 201 and 202 contacts a front edge of the display unit 21 and functions as a positioning boss for positioning the display unit 21 in the front-rear direction. The pressing part 180 contacts a rear edge of the display unit 21 to press the display unit 21 frontward. Thus, the display unit 21 is held by the protrusions 201 and 202 and the pressing part 180 while the display unit 21 is fixed in position in the front-rear direction. Each of the protrusions 203 and 204 contacts a left edge of the display unit 21 and functions as a positioning boss for positioning the display unit 21 in the left-right direction. The pressing part 185 contacts a right edge of the display unit 21 and presses the display unit 21 leftward. Accordingly, the display unit 21 is held by the protrusions 203 and 204 and the pressing part 185 while the display unit 21 is fixed in position in the left-right direction.

By positioning the display unit 21 using the protrusions 201 to 204, the printing device 1 does not require the use of additional parts normally needed when assembling the display unit 21 without the protrusions 201 to 204, thereby requiring less manhours and parts costs lower than a configuration without the protrusions 201 to 204. Since the upper edge of the contact part 189 and the upper edges of the protrusions 181 to 184 are positioned lower than the upper edge of the recess 187, the display unit 21 can be assembled in the middle cover 17 simply by placing the display unit 21 in the recess 187.

In a state where the upper cover 11 is attached to the middle cover 17, the display unit 21 is sandwiched between the middle cover 17 and the upper cover 11 in the up-down direction, as illustrated in FIG. 4A. Specifically, the upper edge of the contact part 189 and the upper edges of the protrusions 181 to 184 contact a lower surface of the display unit 21. The protrusions 181 to 184 press the display unit 21 upward. The contact part 189 contacts the lower surface of the display unit 21 at a position downward of a display area of the display unit 21, while the protrusions 181 to 184 contact the lower surface of the display unit 21 near the respective four corners of the display area. With this configuration, the printing device 1 is less likely to disturb the display on the display unit 21 in comparison with a configuration in which the protrusions 181 to 184 contact the lower surface of the display unit 21 at positions downward of a center of the display area on the display unit 21.

Since the protrusions 181 to 184 are formed on the end portions of the corresponding flexible legs 171 to 174, which extend in the left-right direction, the protrusions 181 to 184 mitigate a load applied to the display unit 21 and readily absorb impacts to the printing device 1 when the printing device 1 is dropped or the like. That is, the display unit 21 is sandwiched while a load is applied thereto in each of the front-rear direction, the left-right direction, and the up-down direction. Hence, even if the printing device 1 receives an impact that could change the position of the display unit 21 relative to the middle cover 17, the attachment part 18 of the middle cover 17 can absorb the impact.

Figure 5:
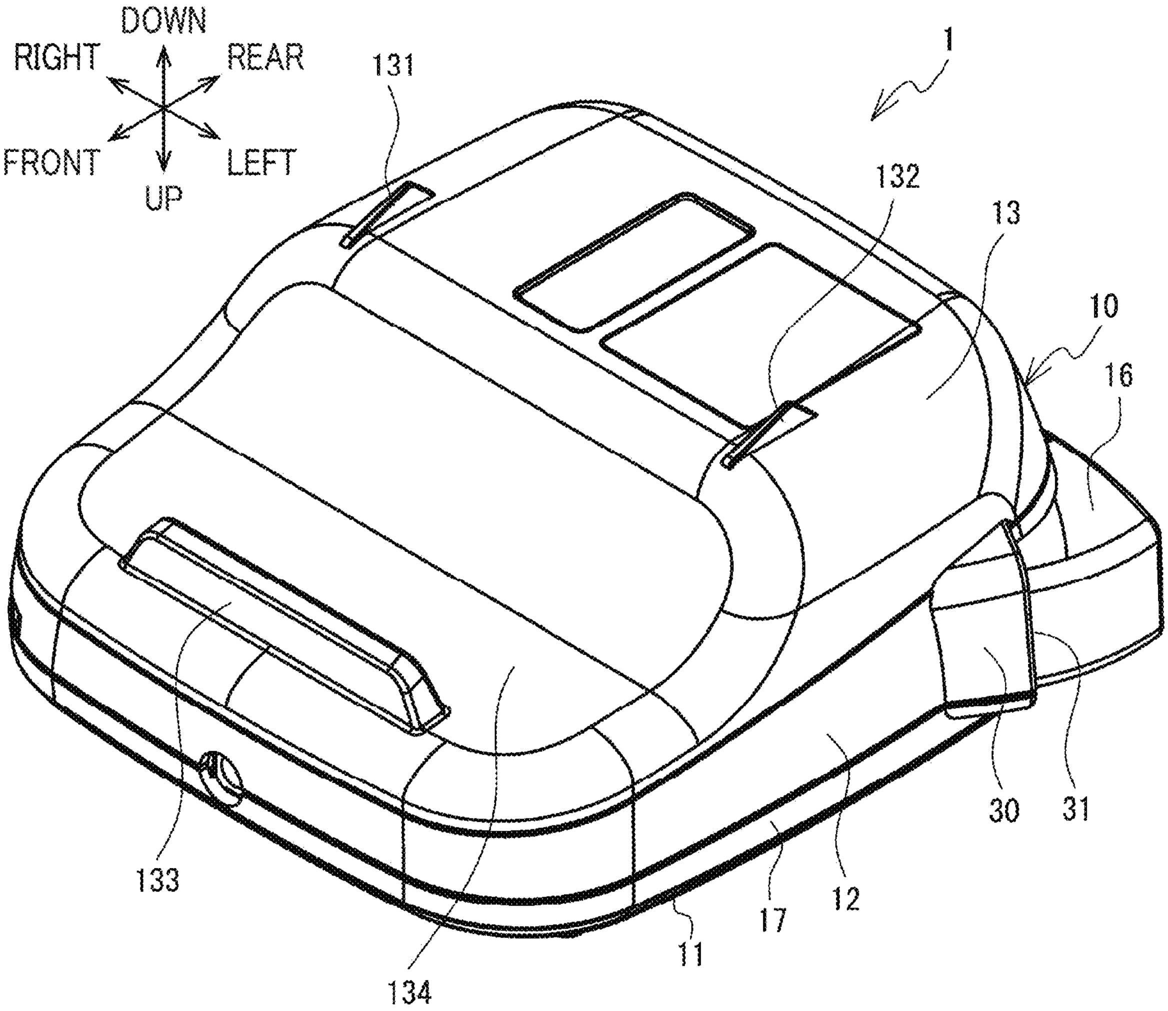
FIG. 5 is another perspective view of the printing device 1.

As illustrated in FIGS. 1 and 5, the lower cover 13 is detachably attached to the main body part 12 at a position downward of the main body part 12. The lower cover 13 is in a form of a square shape whose corner portions are rounded in a bottom view. The lower cover 13 includes protrusions 131 to 133, and a recess 134. The protrusion 131 is provided at a right end portion of a lower surface of the lower cover 13 at a position rearward of the recess 134 to protrude downward. The protrusion 132 is provided at a left end portion of the lower surface of the lower cover 13 at a position rearward of the recess 134 to protrude downward. Each of the protrusions 131 and 132 has a triangular shape that protrudes downward in a right-side view.

The protrusion 133 is provided at a front end portion of the lower surface of the lower cover 13 to protrude downward. The protrusion 133 is elongated in the left-right direction. The recess 134 is formed in a front portion of the lower cover 13 and is recessed upward. When the printing device 1 is placed on a desk or other surface, each of the protrusions 131 to 133 is in contact with the surface to support the printing device 1 during use. When using the printing device 1 on a desk or other surface, an upper surface of the printing device 1 is sloped, relative to the surface, downward as extending frontward.

The lever accommodating part 30 is provided on a rear end portion on a left surface of the housing 10. The lever accommodating part 30 expands leftward from the left surface of the housing 10. The lever accommodating part 30 has a rear portion formed with an opening 31.

The main body part 12 has a box shape whose lower surface is open. As illustrated in FIGS. 6A through 8B, the printing device 1 includes a cassette attachment part 24, a printing head 26, a heat sink 35, a conveying unit 36, indicators 121 and 122, a battery accommodating part 25, a roller holder 70, a cutting device 2, and the like inside the housing 10. More specifically, the cassette attachment part 24, the printing head 26, the heat sink 35, the conveying unit 36, the indicators 121 and 122, the battery accommodating part 25, the roller holder 70, and the cutting device 2 are provided inside the main body part 12 at a position upward of the lower cover 13. A printing cassette C is detachably attached to the cassette attachment part 24.

The cassette attachment part 24 is provided in the main body part 12 of the housing 10 at a position rearward of a center in the front-rear direction of the housing 10. The cassette attachment part 24 is a recess that is recessed upward. As described above, a printing cassette C for supplying tape M is detachably attached to the cassette attachment part 24. The printing head 26, the heat sink 35, the indicator 122, and a drive shaft 27 of the conveying unit 36 are provided in the cassette attachment part 24.

The printing head 26 includes a plurality of heating elements whose heating is individually controlled. The heat sink 35 holds the printing head 26. The heat sink 35 is a metal plate arranged so that a thickness direction of the heat sink 35 is parallel to the left-right direction. The printing head 26 is mounted on a left surface of the heat sink 35. The heat sink 35 functions to dissipate heat from the printing head 26.

The conveying unit 36 is configured to convey the tape M in a conveying direction K. In the present embodiment, the conveying direction K is parallel to the rearward direction. The conveying unit 36 includes the drive shaft 27, a motor 271, a plurality of gears 272, a platen roller 74, and a platen gear 75. The drive shaft 27 is disposed inside the cassette attachment part 24 at a position rightward of the printing head 26. A rotational axis of the drive shaft 27 extends in the up-down direction. The drive shaft 27 is rotatable about the rotational axis when driven by a driving force from the motor 271. The gears 272 are configured to transmit the driving force from the motor 271 to the drive shaft 27. In a state where the printing cassette C is attached to the cassette attachment part 24, the drive shaft 27 is inserted through both a take-up spool and an input gear in the printing cassette C. The drive shaft 27 is configured to input a driving force into the printing cassette C for rotating the take-up spool and the input gear of the printing cassette C. The platen roller 74 and the platen gear 75 will be described later.

The indicators 121 and 122 are patterns illustrating a shape of a lower surface of the printing cassette C, and represent an orientation in which the printing cassette C is to be inserted when attached to the cassette attachment part 24. The indicator 121 is provided at a position rightward of the cassette attachment part 24, while the indicator 122 is provided at a right end portion inside the cassette attachment part 24, more specifically, at a position further frontward relative to the drive shaft 27 and further rightward relative to the printing head 26. The indicator 121 is larger in size than the indicator 122. The indicators 121 and 122 may be stickers that are affixed to the main body part 12, or may be depressions or projections formed in the main body part 12.

Figure 16:
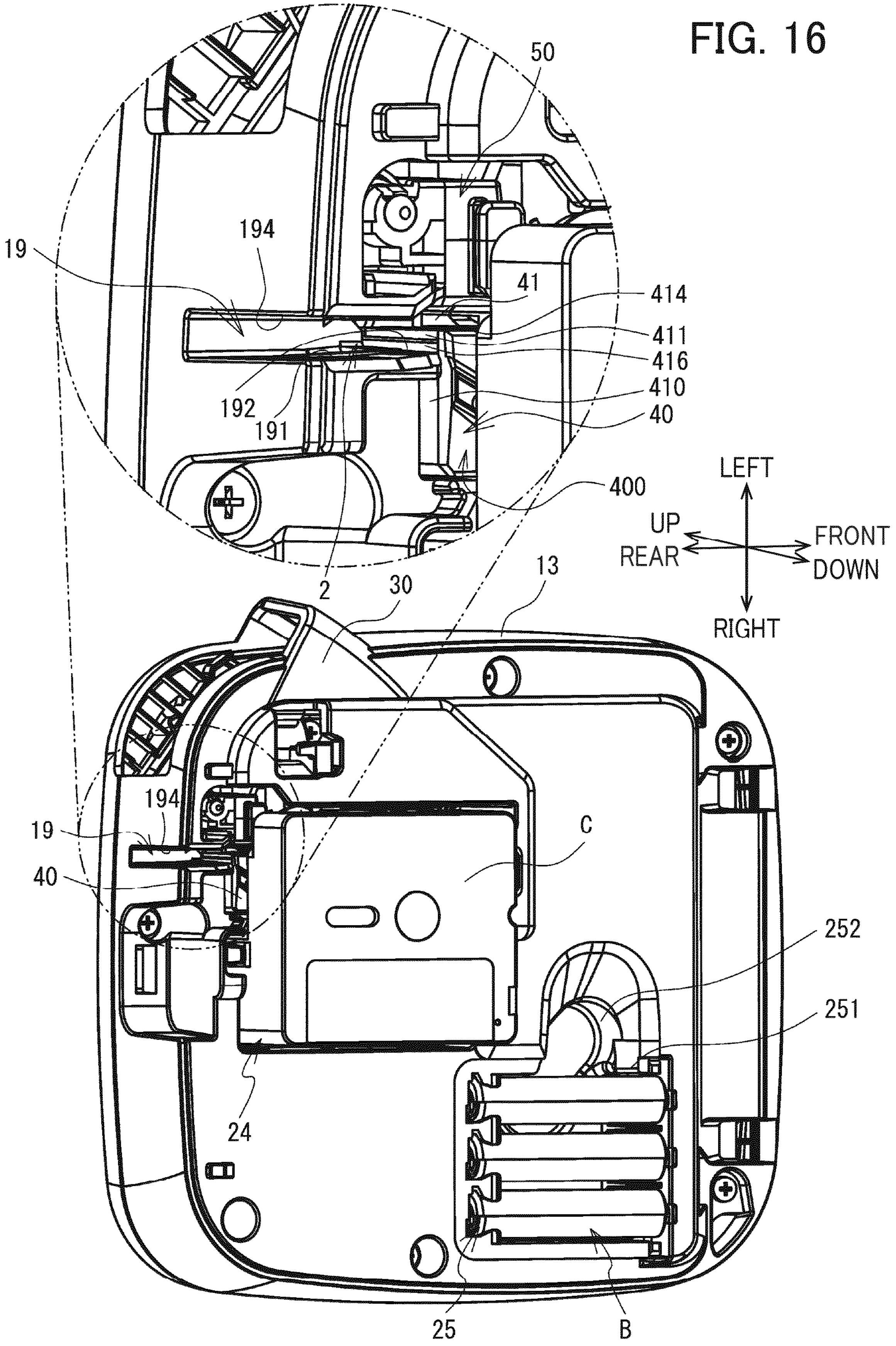
FIG. 16 is a perspective view of the printing device 1 from which the lower cover 13 has been removed.

A user of the printing device 1 can identify a portion to which the printing cassette C is to be attached using the indicator 122. The indicator 122 provided inside the cassette attachment part 24 is not visible to the user during the operation of attaching the printing cassette C to the cassette attachment part 24 because the indicator 122 is covered by the printing cassette C. However, even when performing an operation of attaching the printing cassette C to the cassette attachment part 24, the user can verify the orientation in which the printing cassette C is to be inserted by the indicator 121 provided outside the cassette attachment part 24. Note that the indicators 121 and 122 are omitted in FIGS. 11A, 11B, and 16.

The battery accommodating part 25 is configured to accommodate therein a plurality of batteries B. In the present embodiment, the battery accommodating part 25 is configured to accommodate therein six AA batteries. The battery accommodating part 25 is provided in the main body part 12 of the housing 10 at a position rightward of the cassette attachment part 24 and frontward of the center in the front-rear direction of the housing 10. The battery accommodating part 25 is a recess that is recessed upward. The battery accommodating part 25 is not formed continuously with the cassette attachment part 24 but is positioned apart from the cassette attachment part 24.

The battery accommodating part 25 has a battery housing recess 251, and a recess 252. The battery housing recess 251 is recessed upward, and is configured to hold six AA batteries stacked two deep in the up-down direction in three rows juxtaposed in the left-right direction while the batteries B are arranged so that a longitudinal direction thereof is parallel to the front-rear direction. The recess 252 begins on a left portion of the battery housing recess 251 and extends rightward and rearward to a position downward of an approximate center of the battery housing recess 251. A left wall defining the recess 252 is sloped upward as extending rightward. The recess 252 serves as a space for the user to insert a finger when attaching and detaching the batteries B to and from the battery accommodating part 25.

Figure 7:
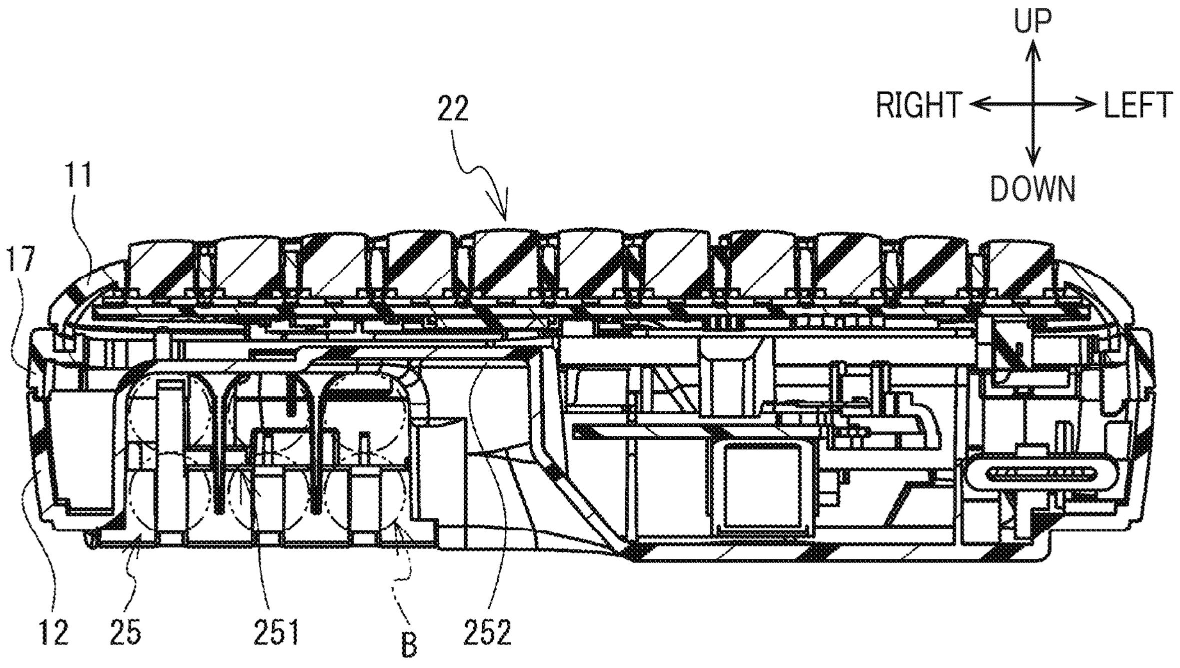
FIG. 7 is a cross-sectional view taken along line VII-VII in FIG. 6A.

As illustrated in FIG. 7, an upper end of the recess 252 is positioned further upward relative to an upper end of the battery housing recess 251, and a right end portion of the recess 252 is overlapped with a left end portion of the battery housing recess 251. More specifically, the right end portion of the recess 252 extends to a portion of the battery housing recess 251 that accommodates therein the batteries B in the center in the left-right direction. By inserting a finger or other tool into the recess 252, the user can push upper end portions of the upper batteries B accommodated in the battery housing recess 251 to remove the batteries B. In a state where the lower cover 13 is detached from the main body part 12, the cassette attachment part 24 and the battery accommodating part 25 are exposed to the outside of the printing device 1. Accordingly, while the lower cover 13 is detached from the main body part 12, the user can replace both the printing cassette C and the plurality of batteries B.

The roller holder 70 has a box shape that extends in the front-rear direction at a position leftward of the cassette attachment part 24, and has a right end portion open rightward. The roller holder 70 is supported by a support plate 60 so as to be pivotally movable about a shaft 71 extending in the up-down direction at a front end portion of the roller holder 70. Specifically, while supported by the support plate 60, the roller holder 70 is pivotally movable about the shaft 71 in a direction toward the printing head 26 and in a direction away from the printing head 26. The roller holder 70 holds the platen roller 74, the platen gear 75, and a detection unit 76.

The platen roller 74 and the platen gear 75 configure a part of the conveying unit 36. The platen roller 74 is supported at a rear end portion of the roller holder 70 so as to be rotatable about a shaft 77 extending in the up-down direction. The platen roller 74 is disposed near the printing head 26 so as to face the same. The platen gear 75 is fixed to a lower end portion of the shaft 77 for the platen roller 74, and is configured to engage with an output gear in the printing cassette C. That is, the platen gear 75 is coupled to the platen roller 74 via the shaft 77 to be rotatable and pivotally movable together with the platen roller 74. When a printing cassette C has been attached to the cassette attachment part 24, the platen roller 74 is configured to receive a driving force from the drive shaft 27 via a drive transmission mechanism in the printing cassette C. The platen roller 74 is configured to convey the printed tape M from an inside of the printing cassette C toward an outside of the printing cassette C.

The detection unit 76 includes a plurality of detection switches, and is configured to detect cassette identification information by mechanically detecting recesses, using the plurality of detection switches, formed in a left surface of the printing cassette C corresponding to a type of the printing cassette C. A spring (not illustrated) urges the roller holder 70 to be pivotally moved in a clockwise direction in a bottom view about the shaft 71. When the lower cover 13 is closed while the printing cassette C is attached to the printing device 1, the roller holder 70 is pressed rightward and is pivotally moved in a counterclockwise direction in a bottom view against an urging force of the spring.

The cutting device 2 is configured to cut tape M that has been discharged through a discharge opening formed in the printing cassette C. The cutting device 2 is configured to cut the tape M in a thickness direction of the tape M, i.e., in the left-right direction. The cutting device 2 includes the support plate 60, a cutting mechanism 50, a cutter lever 16, a blade receiver 40, a path-forming part 19, a first pressing member 81, and a second pressing member 82.

As illustrated in FIGS. 8A through 9B, the support plate 60 has a plate-like shape and extends in both the left-right direction and the front-rear direction. The support plate 60 is made of metal. The support plate 60 is formed with an insertion hole 61, and includes a frame 62, a shaft 63, and the shaft 71. The insertion hole 61 is formed in a rear end portion of the support plate 60 and penetrates the support plate 60 in the up-down direction. The insertion hole 61 has a length in the front-rear direction greater than a length in the left-right direction of the insertion hole 61. In other words, the insertion hole 61 is an elongate hole elongated in the front-rear direction.

The frame 62 is a plate-like part of the support plate 60 that has been folded downward at a position rightward of the insertion hole 61. An engagement portion 64 (see FIGS. 4A to 4C) is formed in the frame 62. The engagement portion 64 is a hole that penetrates the frame 62 in the front-rear direction. The engagement portion 64 is formed at a position further upward relative to a center in the up-down direction of the frame 62. The shaft 63 extends downward from a lower surface of the support plate 60 at a position diagonally rearward and leftward of the insertion hole 61.

Figure 8A:
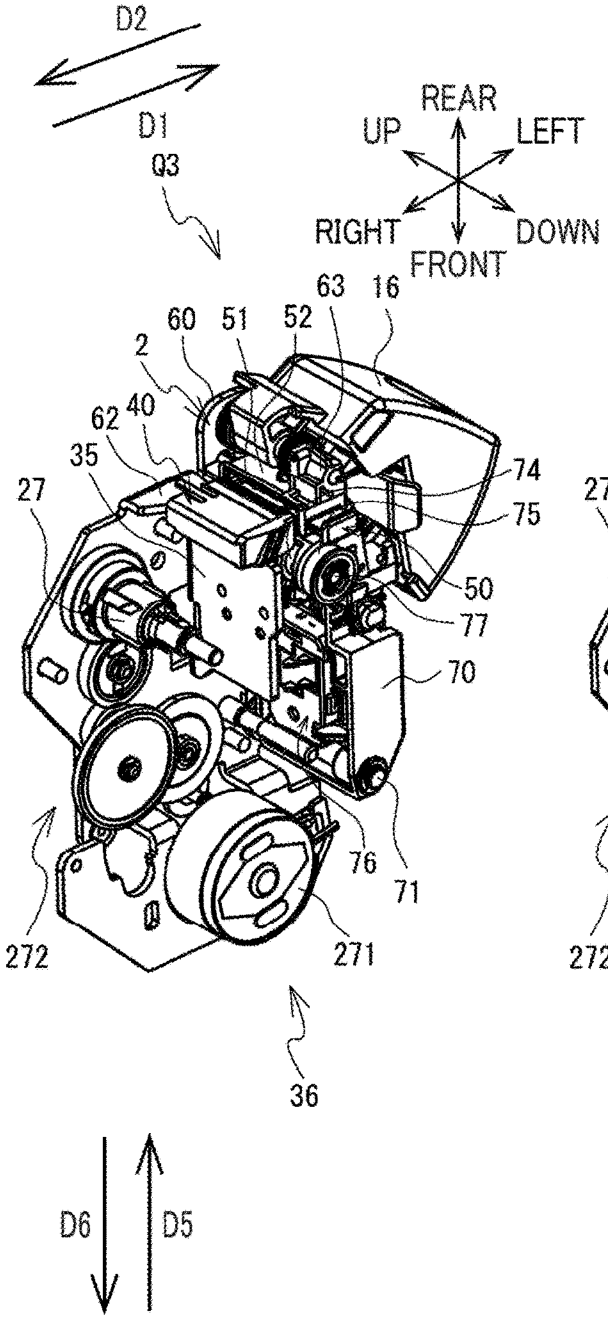
FIG. 8A is a perspective view of a cutting device 2, and illustrating a state Q3 in which a cutting mechanism 50 has been mounted thereon.
Figure 8B:
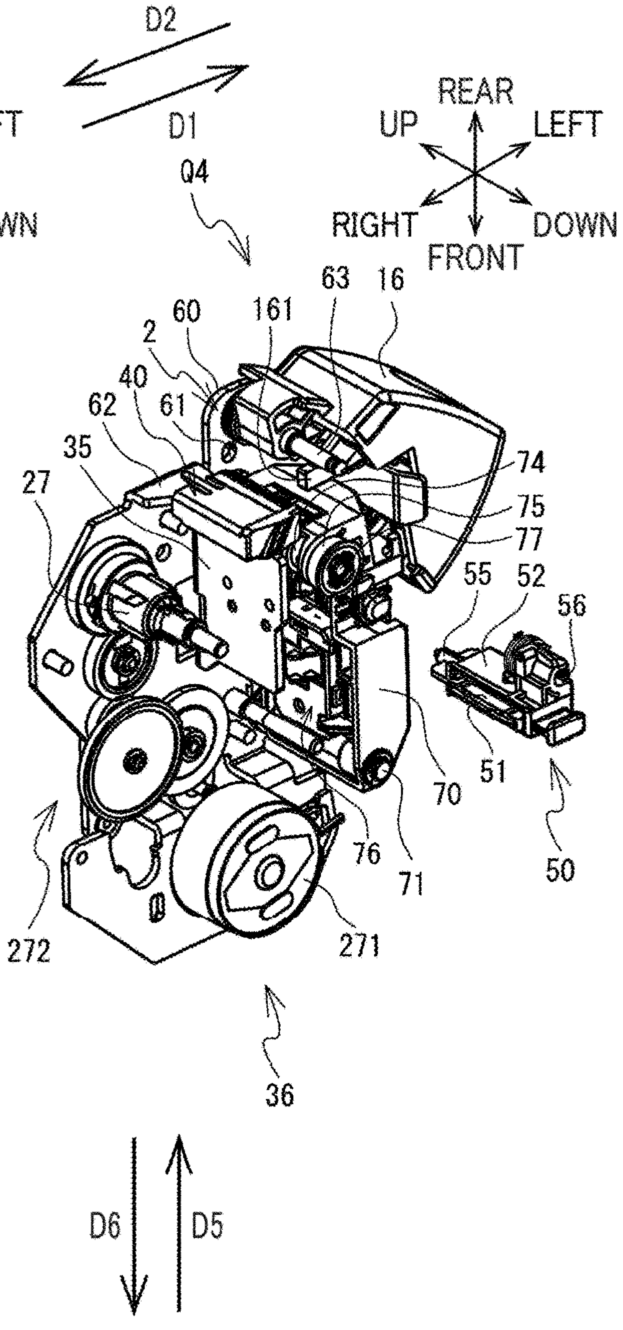
FIG. 8B is another perspective view of the cutting device 2, and illustrating a state Q4 in which the cutting mechanism 50 has been removed therefrom.
Figure 9A:
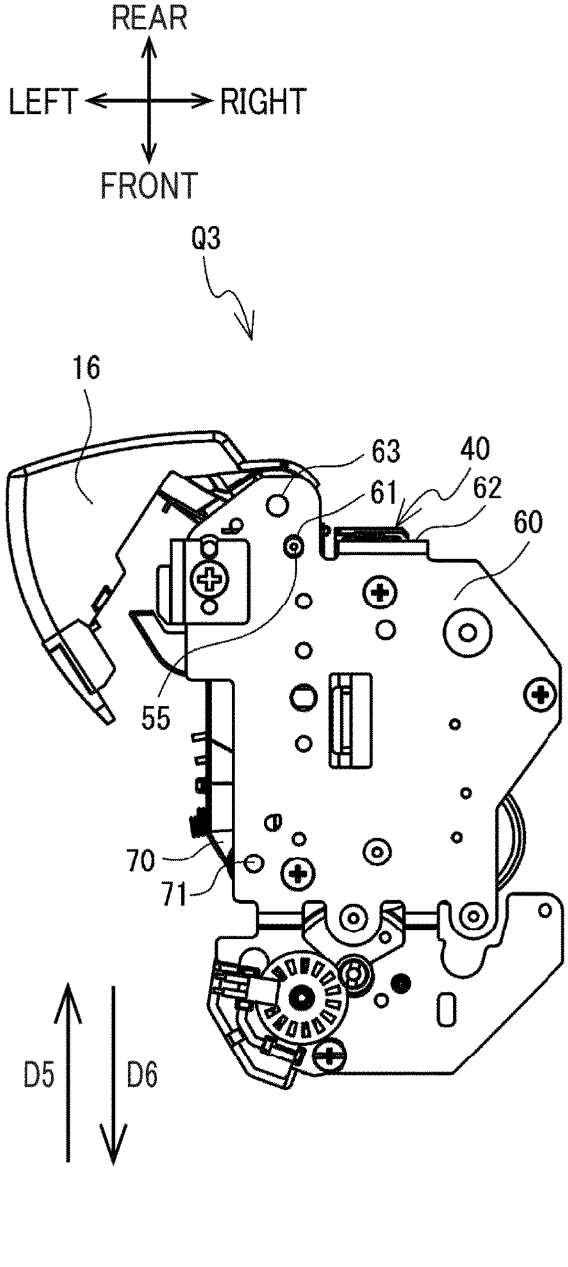
FIG. 9A is a plan view of the cutting device 2, and illustrating the state Q3 in which the cutting mechanism 50 has been mounted thereon.
Figure 9B:
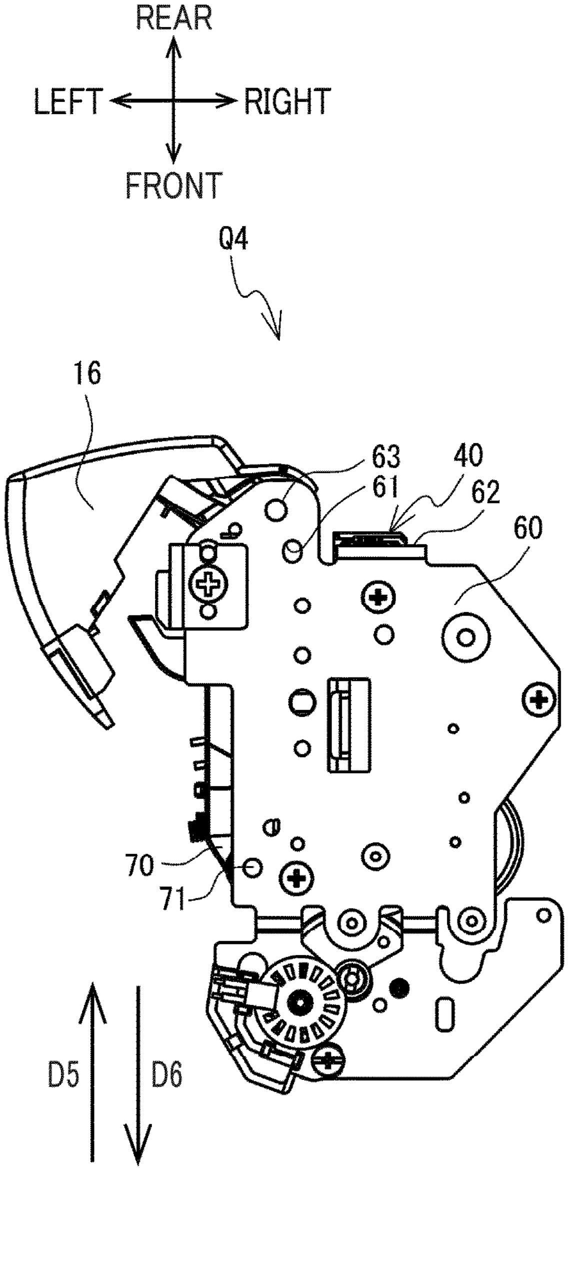
FIG. 9B is another plan view of the cutting device 2, and illustrating the state Q4 in which the cutting mechanism 50 has been removed therefrom.
Figure 10A:
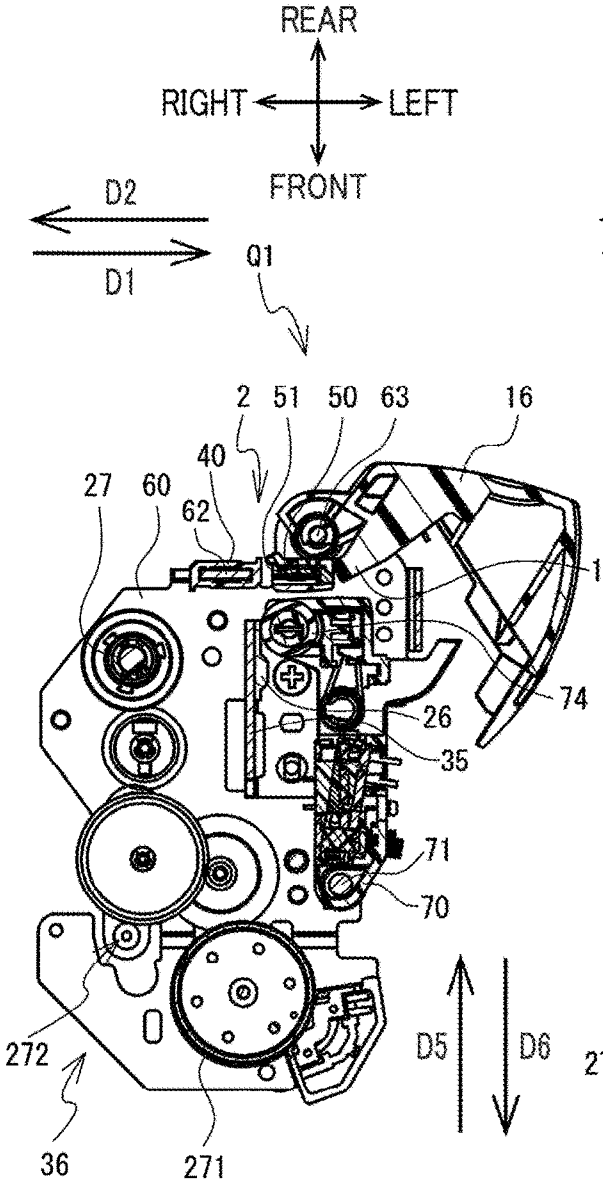
FIG. 10A is a cross-sectional view of the cutting device 2, and illustrating a state Q1 in which a cutter lever 16 is in its standby position and a cutting blade 51 is in its normal position.
Figure 10B:
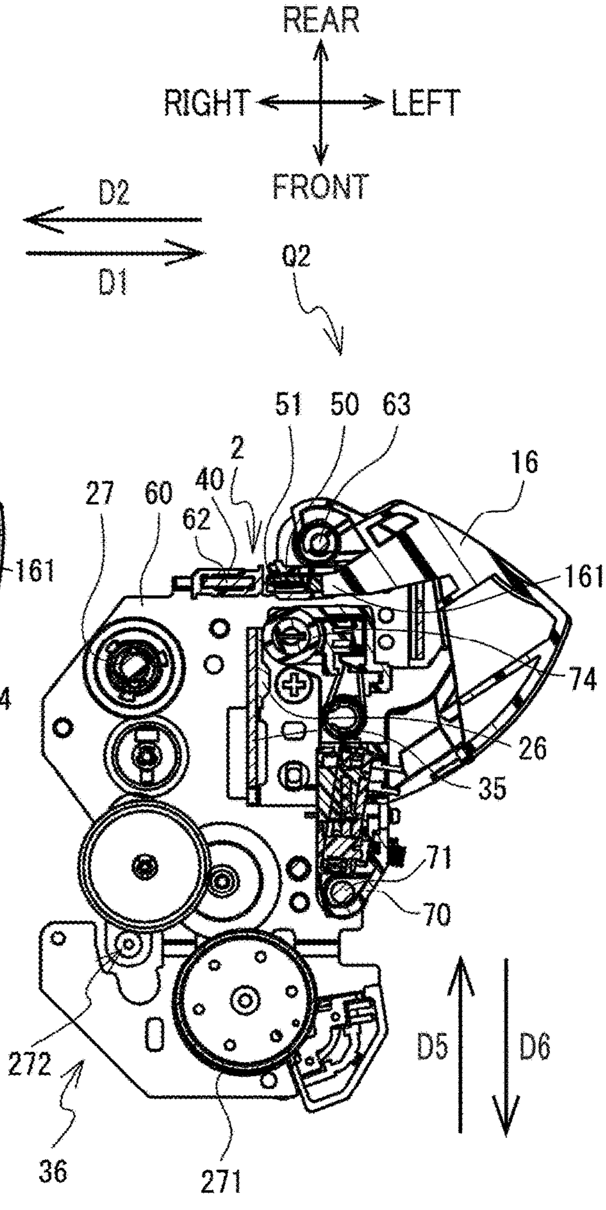
FIG. 10B is a cross-sectional view of the cutting device 2, and illustrating a state Q2 in which the cutter lever 16 is in its operating position and the cutting blade 51 is in its cutting position.

The cutting mechanism 50 includes a cutting blade 51, a support member 52, a shaft 55, and an insertion part 56. The cutting mechanism 50 is mounted on the support plate 60 so as to be removable from the support plate 60. Note that FIGS. 8A and 9A illustrate a state Q3 in which the cutting mechanism 50 has been mounted on the support plate 60, while FIGS. 8B and 9B illustrate a state Q4 in which the cutting mechanism 50 has been removed from the support plate 60. The cutting blade 51 is a blade elongated in the up-down direction and is supported while a cutting edge of the cutting blade 51 faces rightward. The cutting blade 51 is movable between a cutting position illustrated in a state Q2 of FIG. 10B, and a normal position illustrated in a state Q1 of FIG. 10A. In the cutting position, the cutting blade 51 cuts, against a first receiving surface 41 of the blade receiver 40 (described later), tape M that has been conveyed in the conveying direction K along the first receiving surface 41 by nipping the tape M between the cutting blade 51 and the first receiving surface 41. In the normal position, the cutting blade 51 is in separation from the first receiving surface 41. In the present embodiment, the cutting blade 51 is movable in the left-right direction in response to an operation on the cutter lever 16.

The support member 52 supports the cutting blade 51 so that the cutting blade 51 is movable between the cutting position and the normal position. The support member 52 has a box shape elongated in the up-down direction and having a right end that is open rightward. In a state where the cutting blade 51 is in the normal position, a right edge (i.e., the cutting edge) of the cutting blade 51 is further leftward relative to the right end of the support member 52. In a state where the cutting blade 51 is in the cutting position, the right edge of the cutting blade 51 is further rightward relative to the right end of the support member 52.

The shaft 55 extends upward from an upper surface of the support member 52. The shaft 55 is inserted into the insertion hole 61 of the support plate 60. The insertion part 56 is a part having a tubular shape and elongated in the up-down direction. The insertion part 56 is provided rearward of the support member 52. The shaft 63 of the support plate 60 is inserted into the insertion part 56. In order to mount the cutting mechanism 50 on the support plate 60, the user inserts the shaft 55 into the insertion hole 61 and inserts the shaft 63 into the insertion part 56.

As described above, the insertion hole 61 is a hole elongated in the front-rear direction. Therefore, even if the cutting mechanism 50 and the support plate 60 have manufacturing tolerances, the insertion hole 61 functions to fix the cutting mechanism 50 in position relative to the support plate 60. The longitudinal direction of the insertion hole 61, which is the front-rear direction, is orthogonal to a direction in which the cutting blade 51 is moved, which is the left-right direction. Accordingly, the printing device 1 can cut the tape M at the intended position by suppressing any wobble in the cutting blade 51 during a cutting operation that may be caused by the insertion hole 61.

The cutter lever 16 has a triangular shape protruding leftward in a plan view. The cutter lever 16 is supported by the support plate 60 so as to be pivotally movable about the shaft 63 between an operating position illustrated in the state Q2 of FIG. 10B, and a standby position illustrated in the state Q1 of FIG. 10A. In the operating position, the cutter lever 16 places the cutting blade 51 in the cutting position. In the standby position, the cutter lever 16 places the cutting blade 51 in the normal position. The shaft 63 is inserted into a tubular insertion part 162 (see FIG. 15) provided on a right-rear end portion of the cutter lever 16. The insertion part 162 extends in the up-down direction orthogonal to the support plate 60. The cutter lever 16 includes a protrusion 161 that protrudes diagonally rightward and frontward from a left portion of the insertion part 162. A torsion spring 163 (see FIG. 15) is wound around the insertion part 162 of the cutter lever 16. The torsion spring 163 urges the cutter lever 16 so that the cutter lever 16 is pivotally moved in a counterclockwise direction in a bottom view, i.e., toward the standby position.

The cutter lever 16 has a front end portion that is covered by the lever accommodating part 30 and the main body part 12. In a state where the cutter lever 16 is at the standby position, a rear end portion of the cutter lever 16 is exposed to an outside of the housing 10. The rear end portion of the cutter lever 16 moves in and out of the housing 10 through the opening 31 in the lever accommodating part 30 in response to user operations. In accordance with movement of the cutter lever 16 through a user operation from the standby position indicated by the state Q1 in FIG. 10A to the operating position indicated by the state Q2 in FIG. 10B, the protrusion 161 is pivotally moved in a clockwise direction in a bottom view (i.e., in FIGS. 10A and 10B) about the shaft 63 and contacts the cutting mechanism 50 from the left side thereof, thereby moving the cutting blade 51 from the normal position to the cutting position. When the user operation on the cutter lever 16 ends, an urging force of the torsion spring 163 causes the cutter lever 16 to be moved back from the operating position to the standby position and the protrusion 161 separates from the cutting mechanism 50. As a result, the cutting blade 51 returns to the normal position from the cutting position.

The blade receiver 40 has a box shape elongated in the up-down direction and having an upper end that is open upward. The blade receiver 40 is formed of resin having flexibility. The blade receiver 40 has the first receiving surface 41, and is configured to receive a tape M conveyed in the conveying direction K which is along the first receiving surface 41. The first receiving surface 41 is a surface having a rectangular shape elongated in the up-down direction. The first receiving surface 41 faces the cutting blade 51 in the left-right direction. A length in the up-down direction of the first receiving surface 41 is greater than a length in the up-down direction of the cutting blade 51. In addition to the first receiving surface 41, the blade receiver 40 has a first side surface 410, an intersecting surface 400, a second receiving surface 42, and a second side surface 420, and includes a first side wall 43, a second side wall 44, a first protrusion 411, a second protrusion 421, a first recess 416 (see FIG. 15), a second recess 426 (see FIG. 15), a recess 48, a first chamfer 415, a second chamfer 425, a first extending part 45, a second extending part 46, and a hook 47.

Figure 11A:
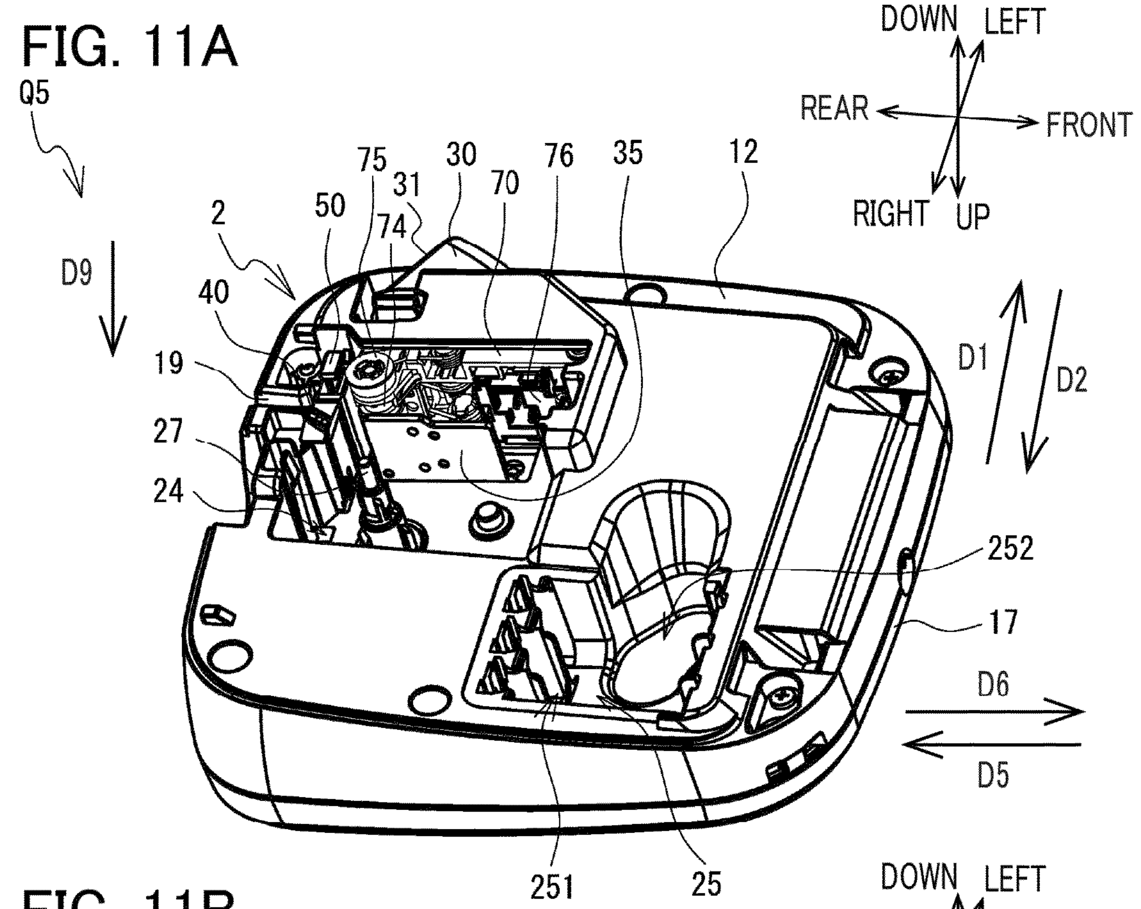
FIG. 11A is a perspective view of the printing device 1, and illustrating a state Q5 in which the blade receiver 40 has been mounted.
Figure 11B:
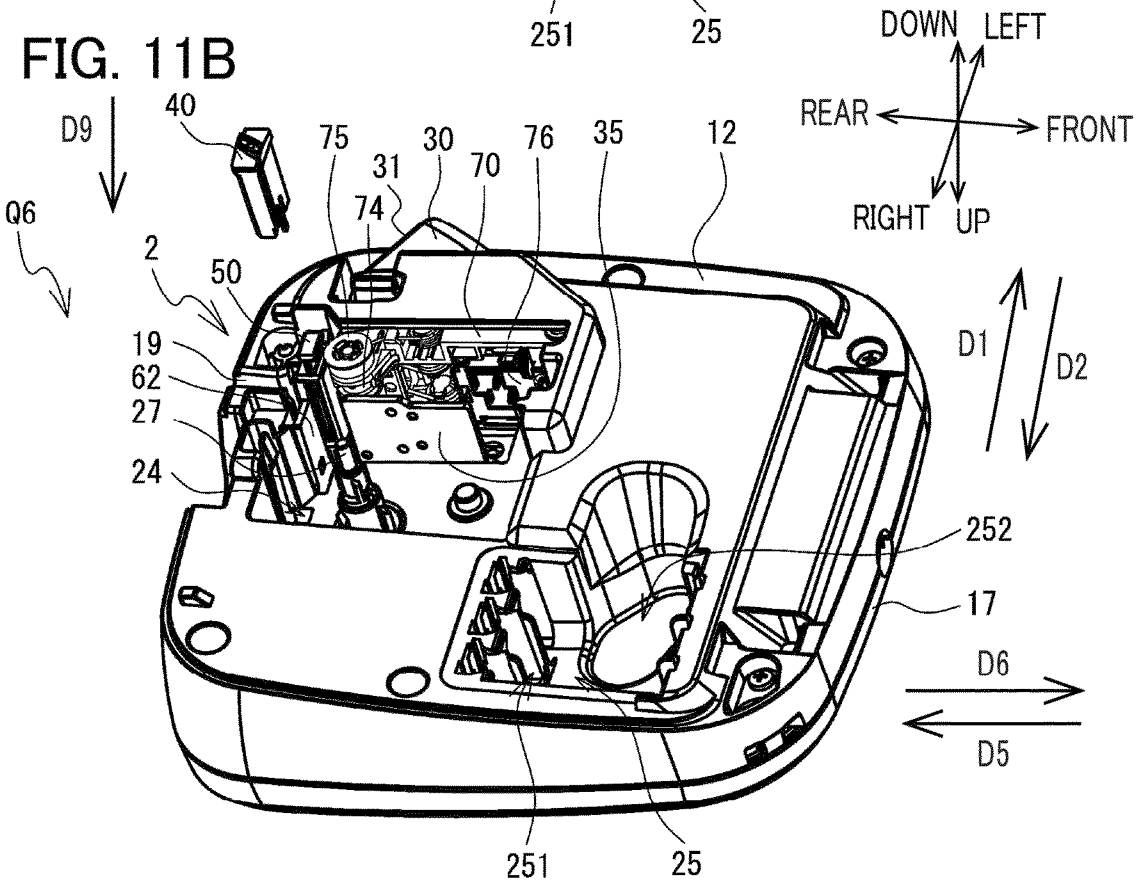
FIG. 11B is another perspective view of the printing device 1, and illustrating a state Q6 in which the blade receiver 40 has been removed.

As illustrated in FIGS. 11A and 11B, the blade receiver 40 is detachably mounted on the frame 62, which extends in the up-down direction, at a position rearward of the cassette attachment part 24. FIG. 11A illustrates a state Q5 in which the blade receiver 40 has been mounted on the frame 62, while FIG. 11B illustrates a state Q6 in which the blade receiver 40 has been removed from the frame 62. More specifically, the blade receiver 40 is mounted on the frame 62 while the blade receiver 40 is in one of two postures described below, i.e., a first posture (a posture illustrated in a state Q7 of FIGS. 4B and 6B) in which the first receiving surface 41 faces the cutting blade 51, and a second posture (a posture illustrated in a state Q8 of FIGS. 4C and 6C) in which the second receiving surface 42 faces the cutting blade 51. In the following description, the configuration of the blade receiver 40 will be described on the basis of a state in which the blade receiver 40 is mounted on the frame 62 while the blade receiver 40 is in the first posture.

Also, in the following description, a direction from the blade receiver 40 toward the cutting blade 51 will also be referred to as "first direction D1", and a direction opposite the first direction D1 will also be referred to as "second direction D2". In the present embodiment, the first direction D1 is parallel to the leftward direction, while the second direction D2 is parallel to the rightward direction. Further, of directions parallel to the first receiving surface 41 and orthogonal to the conveying direction K, a direction in which the first receiving surface 41 is positioned relative to the intersecting surface 400 will be referred to as "third direction D3", and a direction opposite the third direction D3 will be referred to as "fourth direction D4". In the present embodiment, the third direction D3 is parallel to the upward direction, and the fourth direction D4 is parallel to the downward direction.

A direction parallel to the conveying direction K (i.e., a direction toward a downstream side in the conveying direction K) will be referred to as "downstream direction D5", and a direction opposite the downstream direction D5 (i.e., a direction toward an upstream side in the conveying direction K) will be referred to as "upstream direction D6". In the present embodiment, the downstream direction D5 is parallel to the rearward direction, and the upstream direction D6 is parallel to the frontward direction. A direction in which the second extending part 46 of the blade receiver 40 in the first posture is positioned relative to the frame 62 will be referred to as "first side direction D7", while a direction opposite the first side direction D7 (i.e., a direction in which the first extending part 45 of the blade receiver 40 in the first posture is positioned relative to the frame 62) will be referred to as "second side direction D8". In the present embodiment, the first side direction D7 is parallel to the rearward direction, and the second side direction D8 is parallel to the frontward direction. A direction in which the blade receiver 40 moves when the blade receiver 40 is mounted on the frame 62 will be referred to as "mounding direction D9". The mounting direction D9 in the present embodiment is parallel to the upward direction.

Figure 13:
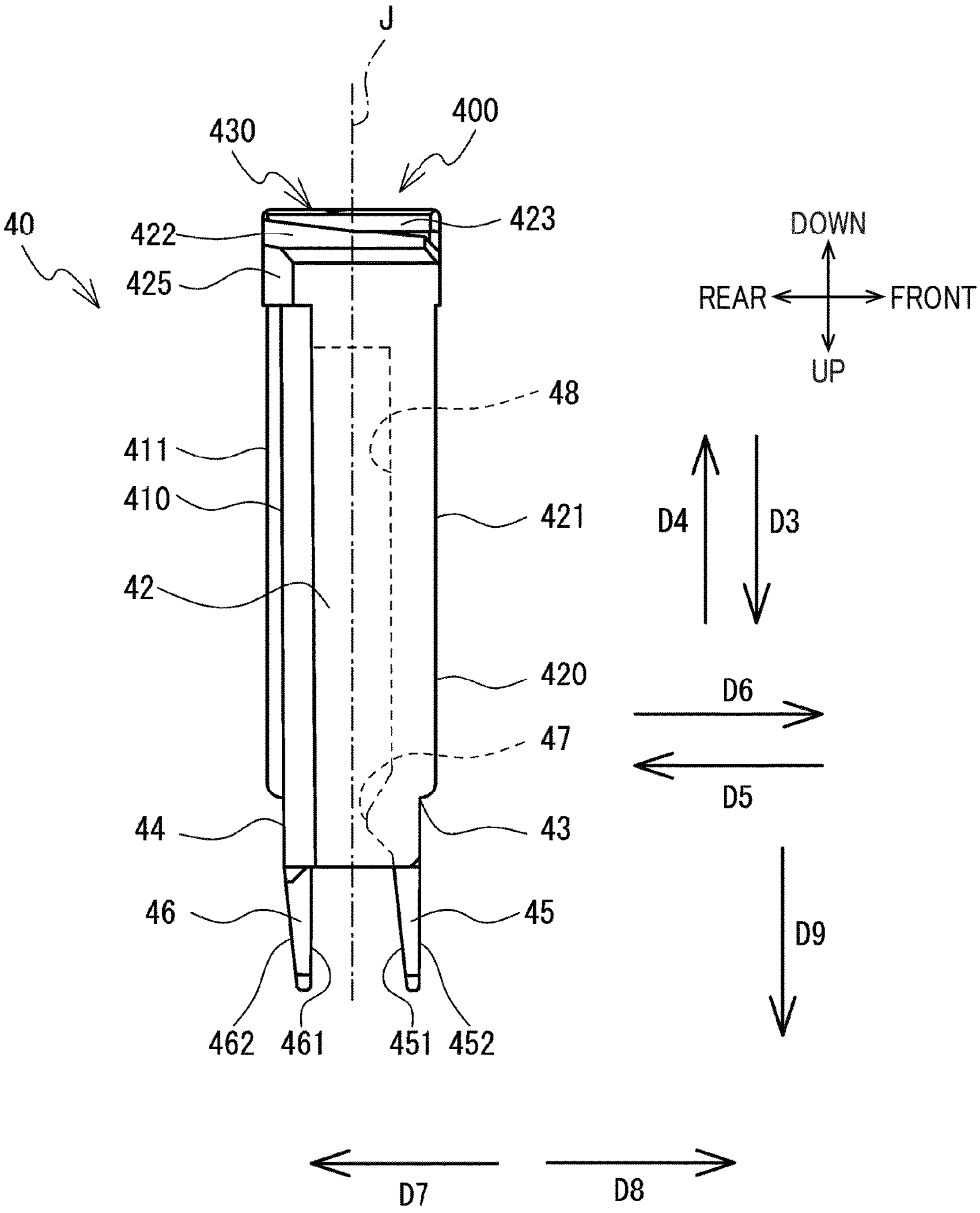
FIG. 13 is a right side view of the blade receiver 40.
Figure 14:
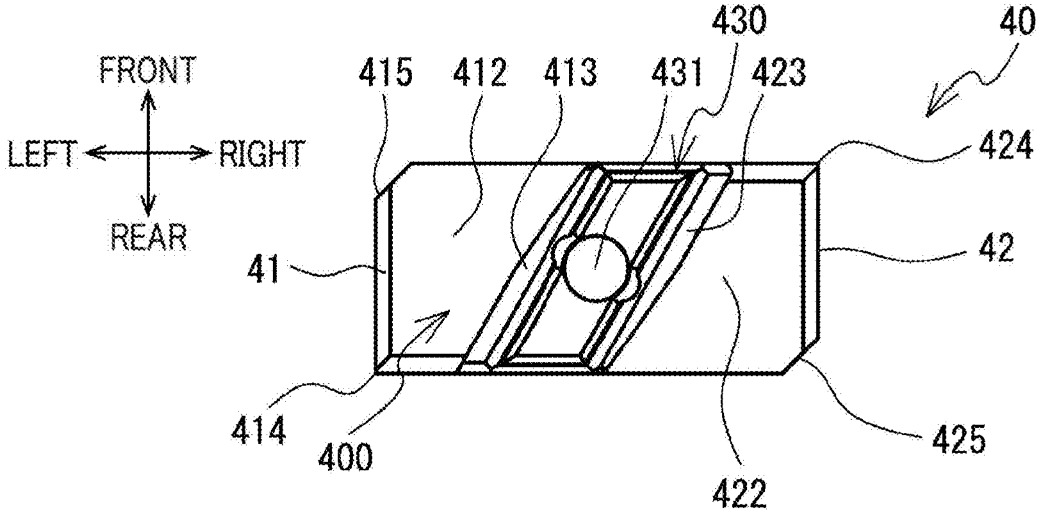
FIG. 14 is a bottom view of the blade receiver 40.
Figure 15:
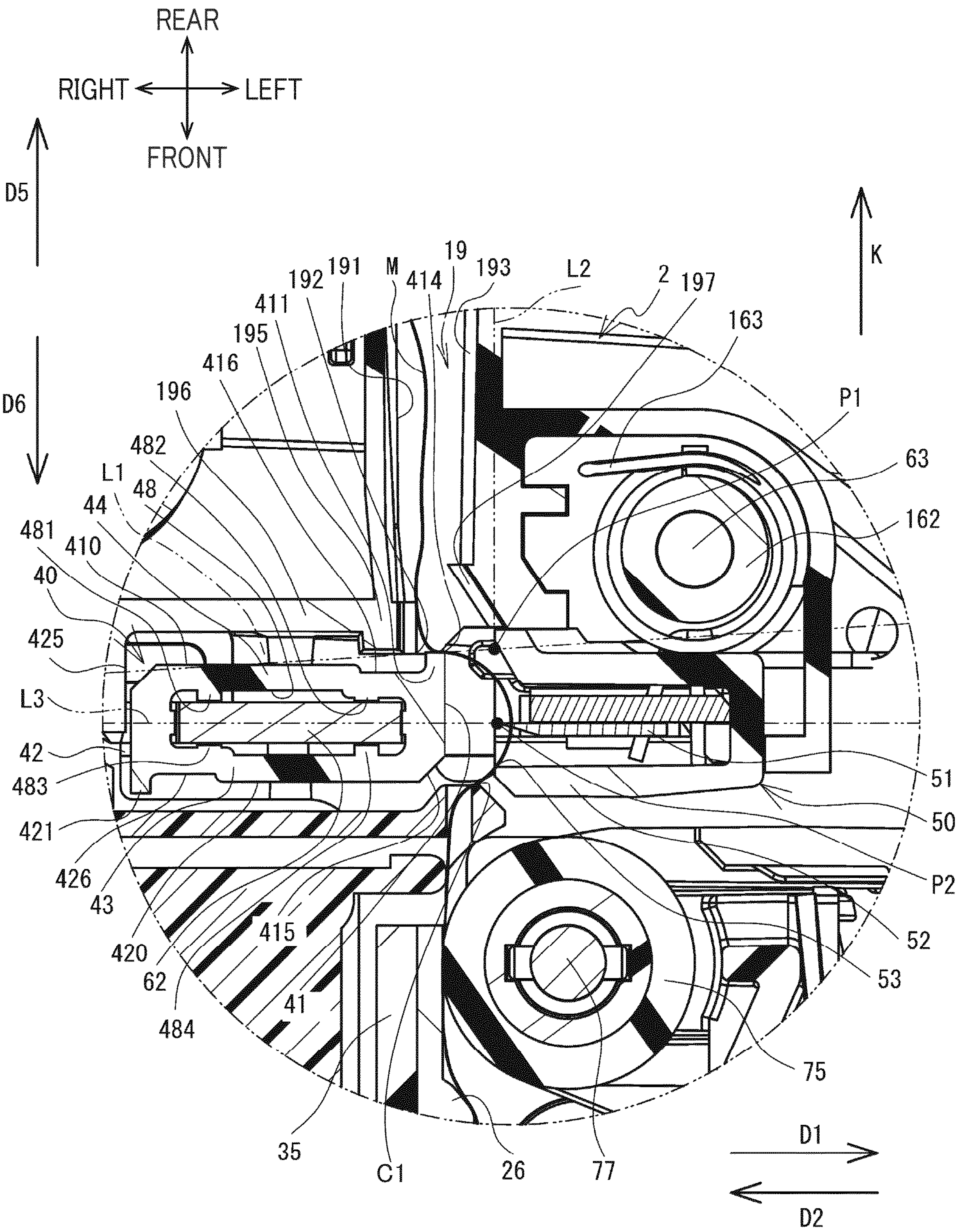
FIG. 15 is a partial cross-sectional view taken along line XV-XV in FIG. 1.

As illustrated in FIGS. 13 and 15, the first side surface 410 is a surface of the blade receiver 40 in the downstream direction D5, i.e., a rear surface of the blade receiver 40. The first side surface 410 has a rectangular shape elongated in the up-down direction orthogonal to the conveying direction K. The second side wall 44 intersects the first receiving surface 41, and opposes the first side wall 43. The second side wall 44 is a wall portion in the blade receiver 40 that forms the first side surface 410. The first protrusion 411 protrudes from the first side surface 410 in the downstream direction D5. In the present embodiment, the first protrusion 411 is positioned between a right wall 191 and a left wall 193 of the path-forming part 19 (described later) in the left-right direction. The first protrusion 411 forms a rear end portion of the first receiving surface 41 on the blade receiver 40. The first protrusion 411 has a second end 414 on the downstream direction D5. That is, the second end 414 is also an end in the downstream direction D5 of the first receiving surface 41.

The first recess 416 is a part of the first side surface 410 that is connected to a right end of the first protrusion 411 and that is recessed frontward. The first recess 416 faces a protrusion 195 formed in a front end of the right wall 191 constituting the path-forming part 19 (described later). Formation of the first recess 416 enables the blade receiver 40 to avoid interfering with the path-forming part 19, even if a distance between the blade receiver 40 and the protrusion 195 of the path-forming part 19 is small due to manufacturing tolerances. The first chamfer 415 is a chamfered part formed on a left-front corner of the blade receiver 40.

As illustrated in FIGS. 12 through 15, the intersecting surface 400 is connected to both the first side surface 410 in the downstream direction D5 and the first receiving surface 41, and intersects both the first side surface 410 and the first receiving surface 41. The intersecting surface 400 serves as a lower surface of the blade receiver 40. The intersecting surface 400 includes a third protrusion 430, a first sloped portion 412, and a second sloped portion 422.

The third protrusion 430 is a part of the intersecting surface 400 that includes a center 431 of the intersecting surface 400. The third protrusion 430 extends from an edge in the upstream direction D6 of the intersecting surface 400 to an edge in the downstream direction D5 and protrudes in the fourth direction D4, i.e., downward. The third protrusion 430 has a parallelogram shape in a bottom view, with two of the parallel sides sloping rightward as extending frontward.

The third protrusion 430 has a first protruding surface 413, and a second protruding surface 423. The first protruding surface 413 is a side surface in the first direction D1 of the third protrusion 430, i.e., a left surface. The first protruding surface 413 slopes so as to extend in the third direction D3 while extending away from the center 431 of the intersecting surface 400 in the first direction D1. The second protruding surface 423 is rotationally symmetrical to the first protruding surface 413 about an axis of symmetry J (see FIG. 12). The second protruding surface 423 is a side surface in the second direction D2 of the third protrusion 430, i.e., a right surface. The second protruding surface 423 slopes so as to extend in the third direction D3 while extending away from the center 431 of the intersecting surface 400 in the second direction D2.

Figure 12:
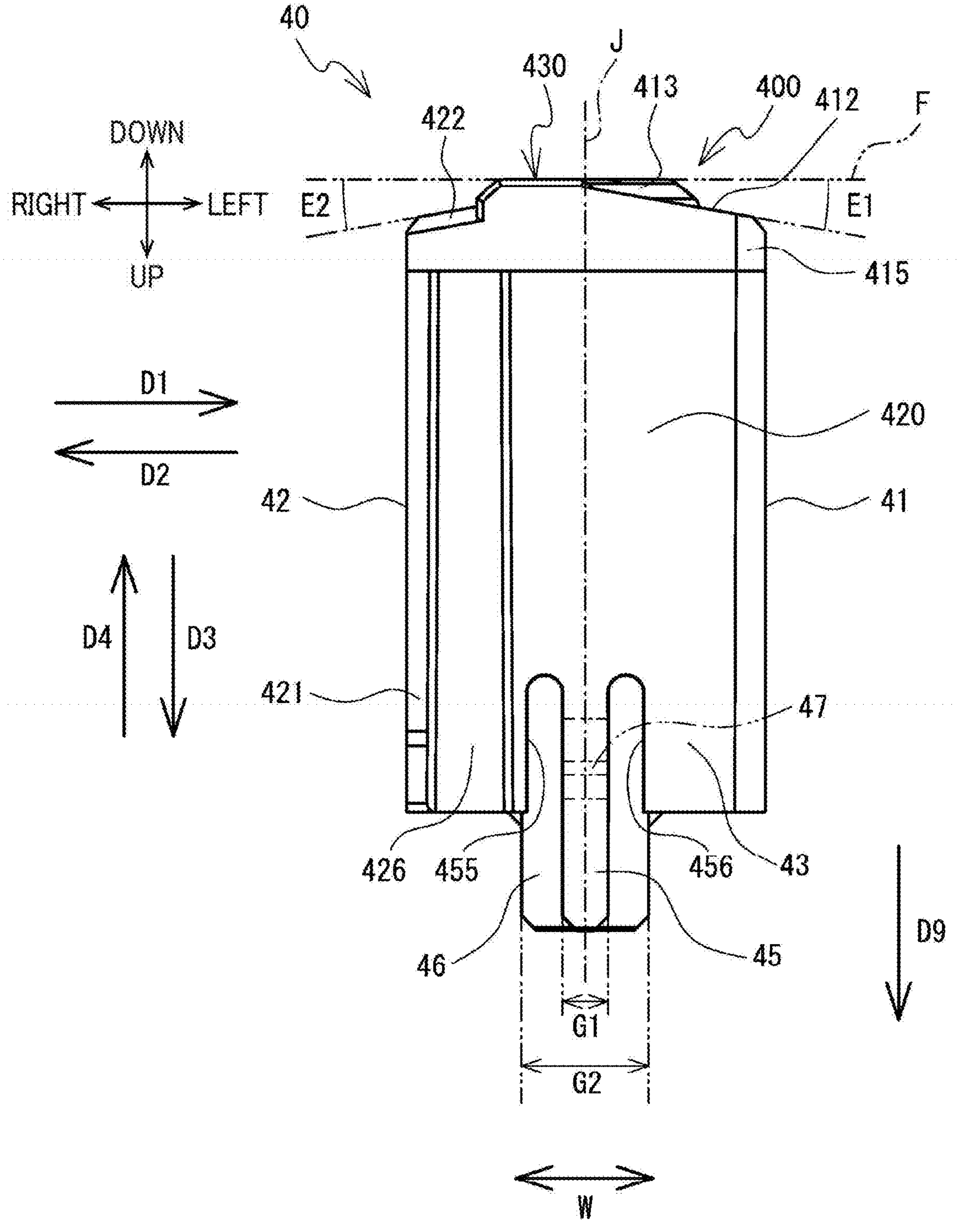
FIG. 12 is a front view of the blade receiver 40.

The first sloped portion 412 slopes so as to extend in the third direction D3 while extending away from the center 431 of the intersecting surface 400 in the first direction D1. The second sloped portion 422 is rotationally symmetrical to the first sloped portion 412 about the axis of symmetry J. The second sloped portion 422 slopes so as to extend in the third direction D3 as extending away from the center 431 of the intersecting surface 400 in the second direction D2. As illustrated in FIG. 12, if a virtual plane F is a plane orthogonal to the axis of symmetry J and passing through an end in the fourth direction D4 of the intersecting surface 400, an angle E1 between the virtual plane F and an edge in the upstream direction D6 of the first sloped portion 412 is equal to an angle E2 between the virtual plane F and an edge in the downstream direction D5 of the second sloped portion 422. The angle E1 and the angle E2 may be set as needed but are preferably in a range between 5 degrees and 30 degrees.

When attaching a printing cassette C to the cassette attachment part 24, the user moves the printing cassette C upward through the lower side of the cassette attachment part 24. At this time, the tape M that is slightly exposed from the printing cassette C may come into contact with the blade receiver 40 adjacent to the cassette attachment part 24. When this occurs in a conventional printing device, an end of the tape M in a portion exposed from the printing cassette C may be caught in a gap between the blade receiver 40 and the printing cassette C and may become jammed. The tape M wound inside the printing cassette C has a tendency to curl, and the curled tape M is more likely to become caught in the gap between the blade receiver 40 and the printing cassette C during an attachment process of the printing cassette C to the cassette attachment part 24 than tape M that is not curled.

For this reason, the blade receiver 40 in the printing device 1 according to the present embodiment includes the first sloped portion 412 and the second sloped portion 422 formed on the intersecting surface 400. When the end of the exposed tape M contacts the intersecting surface 400 on the blade receiver 40 mounted in the first posture illustrated in the state Q7 of FIG. 6B, the end of the tape M contacts the first sloped portion 412. As the user moves the printing cassette C upward from the lower side of the cassette attachment part 24, the end of the tape M exposed from the printing cassette C is guided along the first sloped portion 412 toward the conveying path and is placed in the conveying path without getting caught in the gap between the blade receiver 40 and the printing cassette C.

Figures 6A, 6B, 6C:
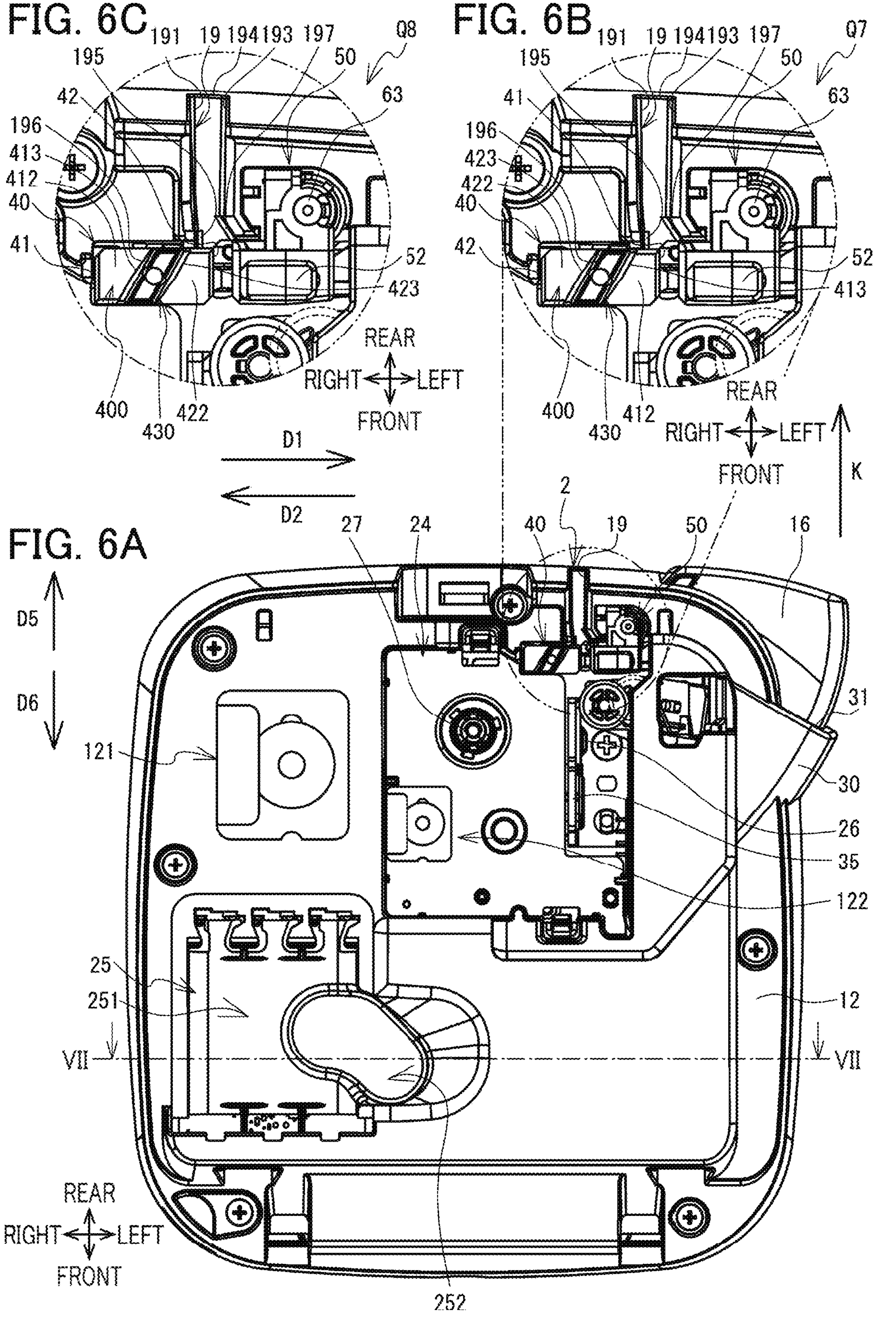
FIG. 6A is a bottom view of the printing device 1 from which a lower cover 13 has been removed.
FIG. 6B is a partial enlarged view of FIG. 6A, and illustrating the state Q7 in which the blade receiver 40 has been mounted in the first posture.
FIG. 6C is another partial enlarged view of FIG. 6A, and illustrating the state Q8 in which the blade receiver 40 has been mounted in the second posture.

Similarly, when the end of the exposed tape M contacts the intersecting surface 400 of the blade receiver 40 mounted in the second posture illustrated in the state Q8 of FIG. 6C, the end of the tape M contacts the second sloped portion 422. As the user moves the printing cassette C upward from the lower side of the cassette attachment part 24, the end of the tape M exposed from the printing cassette C is guided along the second sloped portion 422 toward the conveying path and is placed in the conveying path without getting caught in the gap between the blade receiver 40 and the printing cassette C.

The second receiving surface 42 is rotationally symmetrical to the first receiving surface 41 about the axis of symmetry J passing through the center 431 of the intersecting surface 400, orthogonal to the conveying direction K, and parallel to the first receiving surface 41. The second receiving surface 42 is a surface of the blade receiver 40 on the opposite side from the first receiving surface 41. In a case where the first extending part 45 (described later) is arranged between the frame 62 and the second pressing member 82, i.e., in a case where the blade receiver 40 is mounted on the frame 62 in the second posture, the second receiving surface 42 receives the cutting blade 51 as the cutting blade 51 is placed in the cutting position. The second receiving surface 42 is a rectangular surface that is elongated in the up-down direction. A length in the up-down direction of the second receiving surface 42 is greater than the length in the up-down direction of the cutting blade 51.

The second side surface 420 serves as a side surface in the upstream direction D6 of the blade receiver 40. The second side surface 420 is a surface on the opposite side from the first side surface 410. The first side wall 43 is a side wall that intersects the first receiving surface 41. The first side wall 43 is a wall portion of the box-shaped blade receiver 40 that forms the second side surface 420. Notches 455 and 456 are formed in the first side wall 43. The notches 455 and 456 are cut downward from an upper edge of the first side wall 43. The notches 455 and 456 are adjacent to the first extending part 45 (described later).

The second protrusion 421 is rotationally symmetrical to the first protrusion 411. The second protrusion 421 protrudes in the upstream direction D6 from the second side surface 420. A fourth end 424 of the blade receiver 40 is an end in the upstream direction D6 of the second protrusion 421. In a state where the printing cassette C is attached to the cassette attachment part 24, the second side surface 420 faces a rear wall portion of the printing cassette C in the front-rear direction. In a case where the blade receiver 40 is mounted in the cutting device 2 in the second posture, the second protrusion 421 is positioned between the right wall 191 and the left wall 193 of the path-forming part 19 (described later) in the left-right direction. The second protrusion 421 forms a front end of the second receiving surface 42 on the blade receiver 40. That is, the fourth end 424 also serves as an end in the upstream direction D6 of the second receiving surface 42.

The second recess 426 is a part of the second side surface 420 that is recessed rearward and is connected to a left end of the second protrusion 421. In a case where the blade receiver 40 is mounted in the cutting device 2 in the second posture, the second recess 426 faces the protrusion 195 formed in the front end of the right wall 191 in the path-forming part 19. The second chamfer 425 is a chamfered portion formed in a right-rear corner of the blade receiver 40.

As illustrated in FIG. 13, the recess 48 is a part that is recessed downward from an upper surface of the blade receiver 40. As illustrated in FIG. 15, the recess 48 has a rectangular cross-sectional shape elongated in the approximate left-right direction. Protrusions 481 to 484 are formed in the recess 48. Each of the protrusions 481 to 484 extends in the up-down direction and protrudes toward the frame 62. Each of the protrusions 481 and 482 protrudes frontward from a front surface of the second side wall 44. Each of the protrusions 483 and 484 protrudes rearward from a rear surface of the first side wall 43. In a state where the frame 62 is inserted in the recess 48, the protrusions 481 to 484 are all in contact with the frame 62 to fix the blade receiver 40 in position relative to the frame 62 in the front-rear direction.

As illustrated in FIGS. 4A, 12, and 13, the first extending part 45 is connected to the first side wall 43, and extends in the mounting direction D9 of the blade receiver 40 when the blade receiver 40 is mounted on the frame 62. An upper end of the first extending part 45 is positioned further upward relative to an upper end of the first side wall 43. A center in the left-right direction of the first extending part 45 is aligned with a center in the left-right direction of the first side wall 43. A length G1 (see FIG. 12) in a width direction W of the first extending part 45 is less than one-quarter a length in the width direction W of the first side wall 43. The width direction W is a direction that is orthogonal to the mounting direction D9 and is parallel to the frame 62. In the present embodiment, the width direction W is parallel to the left-right direction. The upper end of the first extending part 45 is chamfered. The first extending part 45 is adjacent to the notches 455 and 456 in the left-right direction. The first extending part 45 flexes when receiving a load in a thickness direction thereof, i.e., in the front-rear direction.

The hook 47 is provided on the first extending part 45 and detachably engages with the engagement portion 64 on the frame 62. The hook 47 is a protrusion that protrudes rearward from a rear surface of the first extending part 45. A part of the hook 47 whose protruding amount is greatest among the entire hook 47 is positioned further upward relative to a lower end of the first extending part 45 and positioned further downward relative to the upper end of the first side wall 43. The first extending part 45 has a first opposing surface 451, and an opposite surface 452 on the opposite side from the first opposing surface 451. The first opposing surface 451 is formed so as to oppose the frame 62. That is, the first opposing surface 451 serves as a rear surface of the first extending part 45. The first opposing surface 451 slopes so as to extend in the second side direction D8 opposite the first side direction D7, i.e., so as to extend away from the frame 62 while advancing in the mounting direction D9. The opposite surface 452 extends parallel to the frame 62.

The second extending part 46 is connected to the second side wall 44 and extends in the mounting direction D9. The second extending part 46 opposes the first extending part 45 in the front-rear direction. A center in the left-right direction of the second extending part 46 is aligned with a center in the left-right direction of the second side wall 44. An upper end of the second extending part 46 is chamfered. The upper end of the second extending part 46 is at the same position in the up-down direction as the upper end of the first extending part 45. The second extending part 46 has a second opposing surface 461, and an opposite surface 462 on the side opposite from the second opposing surface 461. The second opposing surface 461 is provided so as to oppose the frame 62. That is, the second opposing surface 461 serves as a front surface of the second extending part 46. The second opposing surface 461 extends parallel to the frame 62. The opposite surface 462 slopes so as to extend in the second side direction D8, i.e., so as to approach the frame 62 while advancing in the mounting direction D9.

A length G2 (see FIG. 12) in the width direction W of the second extending part 46 is greater than the length G1 in the width direction W of the first extending part 45. Specifically, the length G2 is more than twice the length G1. An area in which the first extending part 45 extends in the left-right direction falls within an area in which the second extending part 46 extends in the left-right direction.

As illustrated in the state Q7 of FIG. 4B, the first pressing member 81 is provided between the cassette attachment part 24 and the frame 62. The first pressing member 81 is shaped to slope so as to approach the frame 62 as extending in the mounting direction D9. While the hook 47 is engaged in the engagement portion 64 of the frame 62, the first pressing member 81 is in contact with a part of the first extending part 45 that is further in the mounting direction D9 relative to the hook 47 and presses the first extending part 45 in the first side direction D7, i.e., toward the frame 62. In the present embodiment, the first pressing member 81 contacts a part on the opposite surface 452 of the first extending part 45 that is further upward relative to the hook 47. The first extending part 45 flexes when pressed by the first pressing member 81 in the first side direction D7. Accordingly, the hook 47 is pressed toward the engagement portion 64, thereby ensuring that the engagement between the hook 47 and the engagement portion 64 is easily maintained, even when a relatively strong impact from a fall or the like is applied to the blade receiver 40.

The second pressing member 82 is arranged on the opposite side of the frame 62 from the first pressing member 81 to oppose the first pressing member 81. The second pressing member 82 is shaped to slope so as to approach the frame 62 as extending in the mounting direction D9. A part of the second pressing member 82 that is closest to the frame 62, i.e., an upper end of the second pressing member 82, has the approximate same position in the up-down direction as an upper end of the first pressing member 81. While the hook 47 is engaged with the engagement portion 64 of the frame 62, the second pressing member 82 is in contact with a part of the second extending part 46 that is further in the mounting direction D9 relative to the hook 47. In the present embodiment, the second pressing member 82 contacts a part on the opposite surface 462 of the second extending part 46 that is further upward relative to the hook 47. The opposite surface 462 in the present embodiment slopes so as to extend in the second side direction D8, i.e., so as to approach the frame 62, as extending in the mounting direction D9. Therefore, the second pressing member 82 applies almost no pressure to the second extending part 46 in the second side direction D8 toward the frame 62.

As illustrated in the state Q8 of FIG. 4C, in a case where the first extending part 45 is disposed between the frame 62 and the second pressing member 82, i.e., in a case where the blade receiver 40 is mounted in the cutting device 2 in the second posture, the second pressing member 82 contacts a part of the first extending part 45 that is further in the mounting direction D9 relative to the hook 47 and presses the first extending part 45 in the second side direction D8 opposite the first side direction D7, i.e., toward the frame 62. This contact of the second pressing member 82 with the first extending part 45 causes the hook 47 to be pressed toward the engagement portion 64, thereby ensuring that the engagement between the hook 47 and the engagement portion 64 is easily maintained, even when the blade receiver 40 is mounted in the cutting device 2 in the second posture and even when a relatively strong impact from a fall or the like is applied to the blade receiver 40.

As illustrated in FIGS. 4B and 4C, a first distance U1 in the front-rear direction between the first pressing member 81 and the frame 62 is shorter than a second distance U2 in the front-rear direction between the second pressing member 82 and the frame 62. Accordingly, a load that the first pressing member 81 applies to the first extending part 45 when the blade receiver 40 is mounted in the first posture is greater than a load that the second pressing member 82 applies to the first extending part 45 when the blade receiver 40 is mounted in the second posture. This configuration is designed to maintain the engagement between the hook 47 and the engagement portion 64 regardless of the mounting posture of the blade receiver 40, while restraining the blade receiver 40 from moving toward the cassette attachment part 24 in the front-rear direction when the blade receiver 40 is mounted in the first posture. In a case where the blade receiver 40 is mounted in the cutting device 2 in the second posture, the first pressing member 81 applies only slight pressure to the second extending part 46 in the first side direction D7, i.e., toward the frame 62.

As illustrated in FIGS. 6A through 6C and 15, the path-forming part 19 is positioned further in the downstream direction D5 relative to the support member 52 to be positioned adjacent to the support member 52. The path-forming part 19 forms a conveying path for the tape M. The path-forming part 19 has a discharge opening 194, and includes the right wall 191, the left wall 193, a facing wall 196, the protrusion 195, and a sloped wall 197.

The discharge opening 194 is an opening formed in a rear end of the path-forming part 19. The right wall 191 and the left wall 193 form the discharge opening 194 therebetween. A distance in the left-right direction between the right wall 191 and the left wall 193 increases as extending toward the discharge opening 194. The facing wall 196 faces the first side surface 410 of the blade receiver 40. The protrusion 195 is formed by the front end of the right wall 191 and a left end of the facing wall 196. The protrusion 195 protrudes further leftward relative to the right wall 191 and protrudes further frontward relative to the facing wall 196. The protrusion 195 faces the first recess 416 of the blade receiver 40 in the front-rear direction.

The sloped wall 197 extends diagonally leftward and frontward from a front end of the left wall 193. The sloped wall 197 is positioned further rightward relative to a right end of the support member 52. With respect to the left-right direction, the protrusion 195 is positioned further rightward relative to the first receiving surface 41, and the sloped wall 197 is positioned further leftward relative to the first receiving surface 41.

As illustrated in FIG. 15, the protrusion 195 of the path-forming part 19 has a first end 192 which is both an end in the first direction D1 of the path-forming part 19 and an end in the upstream direction D6 of the path-forming part 19. In other words, the first end 192 is a left-front end of the protrusion 195. The support member 52 has a third end 53 which is an end in the second direction D2. A first virtual line L1 passes through both the first end 192 of the protrusion 195 and the second end 414, which is an end in the downstream direction D5 of the first receiving surface 41. A second virtual line L2 is parallel to the conveying direction K and passes through the third end 53 of the support member 52. An intersection point P1 at which the first virtual line L1 and the second virtual line L2 intersect when viewed in the up-down direction is positioned further in the downstream direction D5 relative to the cutting blade 51.

It is preferable that the first end 192 is positioned further in the upstream direction D6 and further in the second direction D2 relative to the second end 414. As described above, the first end 192 serves as a left-front end of the protrusion 195. With this positional relationship, with respect to the conveying direction K, an area in which the first protrusion 411 on the blade receiver 40 extends is partially overlapped with an area in which the protrusion 195 on the path-forming part 19 extends. That is, a part of the first protrusion 411 is positioned at the same position in the conveying direction K as a part of the protrusion 195. The first virtual line L1 slopes so as to extend in the downstream direction D5 as advancing in the first direction D1. An amount that the area in which the first protrusion 411 extends in the conveying direction K is overlapped with the area in which the protrusion 195 extends in the conveying direction K may be set as needed.

A third virtual line L3 is orthogonal to the first receiving surface 41 and passes through the cutting edge of the cutting blade 51. An intersection point P2 at which the third virtual line L3 and the second virtual line L2 intersect when viewed in the up-down direction is positioned further in the upstream direction D6 relative to the intersection point P1. The conveying path of the tape M is enclosed by the path-forming part 19.

By satisfying the above relationships, the leading end of the tape M contacts a rear surface of the first protrusion 411 before passing the first end 192. This contact of the tape M with the first protrusion 411 changes the course of the tape M so that the tape M is conveyed in the conveying direction K, even when the tape M is conveyed in the conveying direction K in a curled state, e.g., in an arc shape passing through the three points of a left-rear edge C1 defining the discharge opening of the printing cassette C, the third end 53, and the first end 192, as in the tape M illustrated in FIG. 15. In the present embodiment, the tape M is not expected to curl into an arc shape having a smaller radius than the arc passing through the three points of the left-rear edge C1, the third end 53, and the first end 192 after having passed a portion between the printing head 26 and the platen roller 74.

Even if a tape M having an arc with smaller radius than the arc passing through the three points of the left-rear edge C1, the third end 53, and the first end 192 were to pass through the two points of the left-rear edge C1 and the first end 192, the leading end of the tape M would contact the right wall 191 of the path-forming part 19 after passing the first end 192, and the contact of the tape M with the right wall 191 would change the course of the tape M so that the tape M is conveyed in the conveying direction K. Therefore, the configuration of the cutting device 2 according to the present embodiment is less likely to allow the leading end of tape M to enter the gap between the blade receiver 40 and the facing wall 196 of the path-forming part 19.

Next, a method of perform printing on tape M using the printing device 1 will be described. First, the user opens the lower cover 13 on the main body part 12, attaches a printing cassette C to the cassette attachment part 24 of the printing device 1, and inserts a plurality of batteries B in the battery accommodating part 25. The user then closes the lower cover 13 on the main body part 12. By closing the lower cover 13, the platen roller 74 is placed in a position close to the printing head 26, thereby pressing the tape M and the ink ribbon against the printing head 26.

A controller of the printing device 1 then controls the printing head 26 and the motor 271 to be driven on the basis of print data. The printing head 26 prints images on the tape M by heating the ink ribbon on the basis of the print data. The drive shaft 27 is rotated by the driving force from the motor 271 in order to rotate the platen roller 74. When rotated, the platen roller 74 conveys the tape M in the conveying direction K, i.e., in the rearward direction. As the user operates the cutter lever 16 so that the cutter lever 16 moves from the standby position to the operating position, the cutting blade 51 of the cutting device 2 is moved from the normal position to the cutting position in accordance with the movement of the cutter lever 16 to cut the tape M, and the tape M is discharged out of the main body part 12 through the discharge opening 194. Note that, instead of the user operation of moving the cutter lever 16, the controller of the printing device 1 may control the cutting device 2 to cut the tape M.

The printing device 1 of the embodiment described above includes the printing head 26 configured to perform printing on the tape M, the conveying unit 36 configured to convey the tape M in the conveying direction K, and the cutting device 2 configured to cut the tape M. The cutting device 2 includes the blade receiver 40, the cutting blade 51, the support member 52, and the path-forming part 19. The blade receiver 40 has the first receiving surface 41. The cutting blade 51 is movable between the cutting position in which the cutting blade 51 cuts the tape M conveyed in the conveying direction K along the first receiving surface 41 at a position between the cutting blade 51 and the first receiving surface 41, and the normal position in which the cutting blade 51 is in separation from the first receiving surface 41. The support member 52 supports the cutting blade 51 so that the cutting blade 51 is movable between the cutting position and the normal position. The path-forming part 19 is adjacent to the support member 52 and positioned further in the downstream direction D5 (i.e., positioned further downstream in the conveying direction K) relative to the support member 52, and forms the conveying path for the tape M.

The path-forming part 19 has the first end 192. The first end 192 is both the end in the first direction D1 of the path-forming part 19, and the end in the upstream direction D6 (i.e., the upstream end in the conveying direction K) of the path-forming part 19. The first direction D1 is orthogonal to the blade receiver 40 and is a direction from the blade receiver 40 toward the cutting blade 51. The first receiving surface 41 of the blade receiver 40 has the second end 414. The second end 414 is the end in the downstream direction D5 (i.e., the downstream end in the conveying direction K) of the first receiving surface 41. The support member 52 has the third end 53. The third end 53 is the end in the second direction D2 of the support member 52. The first virtual line L1 passes through both the first end 192 and the second end 414, and the second virtual line L2 is parallel to the conveying direction K and passes through the third end 53. The intersection point P1 at which the first virtual line L1 and the second virtual line L2 intersect when viewed in the up-down direction is positioned further in the downstream direction D5 relative to the cutting blade 51.

Since the blade receiver 40 and the path-forming part 19 in the cutting device 2 of the printing device 1 satisfy the condition that the intersection point P1 at which the first virtual line L1 and the second virtual line L2 intersect when viewed in the up-down direction is further in the downstream direction D5 relative the cutting blade 51 in the conveying direction K, the tape M conveyed in the conveying direction K is less likely to enter the gap between the blade receiver 40 and the path-forming part 19 than a configuration in which the intersection point P1 is further in the upstream direction D6 relative to the cutting blade 51.

The blade receiver 40 has the first side surface 410, which is the side surface in the downstream direction D5 thereof, and includes the first protrusion 411 that protrudes in the downstream direction D5 from the first side surface 410. The second end 414 is the end in the downstream direction D5 of the first protrusion 411. Since the first protrusion 411 of the cutting device 2 restrains the tape M conveyed along the conveying direction K from entering between the blade receiver 40 and the path-forming part 19, the tape M conveyed in the conveying direction K is less likely to enter between the blade receiver 40 and the path-forming part 19 in comparison with a configuration in which the cutting device 2 does not possess the first protrusion 411.

The first end 192 is positioned further in the upstream direction D6 relative to the second end 414, and is positioned further in the second direction D2 relative to the second end 414. In the cutting device 2, the tape M must be bent at least 90 degrees in the second direction D2 at a position close to the first end 192 in order to enter between the blade receiver 40 and the path-forming part 19 while being conveyed in the conveying direction K. Therefore, the cutting device 2 helps reduce the likelihood that tape M conveyed in the conveying direction K enter between the blade receiver 40 and the path-forming part 19.

The blade receiver 40 has the intersecting surface 400 and the second receiving surface 42, and includes the second protrusion 421. The intersecting surface 400 is connected to each of the first side surface 410 in the downstream direction D5 and the first receiving surface 41, and intersects each of the first side surface 410 and the first receiving surface 41. The second receiving surface 42 is rotationally symmetrical to the first receiving surface 41 about the axis of symmetry J. The axis of symmetry J passes through the center 431 of the intersecting surface 400, is orthogonal to the conveying direction K, and is parallel to the first receiving surface 41. The second protrusion 421 is rotationally symmetrical to the first protrusion 411.

The blade receiver 40 is mountable in the cutting device 2 in either the first posture in which the first receiving surface 41 faces the cutting blade 51, or the second posture in which the second receiving surface 42 faces the cutting blade 51. The cutting device 2 can use the blade receiver 40 both in the first posture and in the second posture. Thus, the cutting device 2 can extend the service life of the blade receiver 40 in comparison with a configuration in which the blade receiver 40 can be used only in the first posture.

The blade receiver 40 has the intersecting surface 400 that is connected to each of the first side surface 410 in the downstream direction D5 and the first receiving surface 41 and that intersects each of the first side surface 410 and the first receiving surface 41. The intersecting surface 400 includes the first sloped portion 412 sloped so as to extend in the third direction D3 as extending away from the center 431 of the intersecting surface 400 in the first direction D1. The third direction D3 is orthogonal to the conveying direction K and parallel to the first receiving surface 41, and is a direction from the intersecting surface 400 toward the first receiving surface 41. Even when the tape M contacts the intersecting surface 400, such as when the tape M is arranged along the conveying direction K, the cutting device 2 can guide the tape M contacting the intersecting surface 400 into the gap between the first receiving surface 41 and the cutting blade 51 using the first sloped portion 412 of the intersecting surface 400.

The first sloped portion 412 is sloped so that an amount that the first sloped portion 412 is sloped relative to the third direction D3 becomes greater as extending in the downstream direction D5. Accordingly, the first sloped portion 412 of the cutting device 2 can more smoothly guide the tape M contacting the intersecting surface 400 into the gap between the first receiving surface 41 and the cutting blade 51 in comparison with a configuration in which the first sloped portion 412 is not sloped so that the sloping amount thereof relative to the third direction D3 becomes greater as extending in the downstream direction D5.

The blade receiver 40 includes the third protrusion 430 that contains the center 431 and that extends from the edge in the upstream direction D6 of the intersecting surface 400 to the edge in the downstream direction D5 of the intersecting surface 400. The third protrusion 430 protrudes in the fourth direction D4 opposite the third direction D3. The third protrusion 430 has the first protruding surface 413 in the first direction D1. The first protruding surface 413 is sloped so as to extend in the third direction D3 as extending away from the center 431 of the intersecting surface 400 in the first direction D1. Thus, the third protrusion 430 of the cutting device 2 can smoothly guide the tape M contacting the intersecting surface 400 into the gap between the first receiving surface 41 and the cutting blade 51 by suppressing the tape M from moving in the second direction D2.

The blade receiver 40 has the second receiving surface 42, and includes the second sloped portion 422. The second receiving surface 42 is rotationally symmetrical to the first receiving surface 41 about the axis of symmetry J. The axis of symmetry J passes through the center 431 of the intersecting surface 400, is orthogonal to the conveying direction K, and is parallel to the first receiving surface 41. The second sloped portion 422 is rotationally symmetrical to the first sloped portion 412 about the axis of symmetry J. The third protrusion 430 has the second protruding surface 423, which is rotationally symmetrical to the first protruding surface 413 about the axis of symmetry J. The blade receiver 40 is mountable in the cutting device 2 both in the first posture in which the first receiving surface 41 faces the cutting blade 51, and in the second posture in which the second receiving surface 42 faces the cutting blade 51. The cutting device 2 can use the blade receiver 40 both in the first posture and in the second posture. Thus, the cutting device 2 can extend the service life of the blade receiver 40 in comparison with a configuration in which the blade receiver 40 can be used only in the first posture.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The configurations of the cutting device 2 and the printing device 1 may be modified as appropriate. For example, the cutting device 2 may not be provided in the printing device 1. The type of the printing device 1 may also be modified as needed. For example, the printing device 1 may be an inkjet printer including an inkjet head as the printing head 26. The types and the configurations of the printing cassettes C that is attachable to the printing device 1, as well as those of the tape M that can be accommodated in the printing cassettes C, may be modified as needed. The printing device 1 may be a device configured to perform printing on tape M that is not accommodated in a printing cassette C. The printing device 1 may be a mobile printer that is portable.

The configuration of the blade receiver 40 may be modified as appropriate. The configurations of the intersecting surface 400, the first side surface 410, the first protrusion 411, the first sloped portion 412, the first protruding surface 413, the second receiving surface 42, the second protrusion 421, the second sloped portion 422, the second protruding surface 423, and the third protrusion 430 of the blade receiver 40 may each be modified as appropriate or may be omitted as appropriate. The blade receiver 40 need not have the second receiving surface 42 and may be mountable in the frame 62 only in the first posture. The blade receiver 40 may also have a square columnar shape in which the first chamfer 415 and the second chamfer 425 are not formed, i.e., in which the left-front corner portion and the right-rear corner portion are not chamfered. The first protrusion 411 need not form the first receiving surface 41 and may protrude in the downstream direction D5 at a position on the first side surface 410 further in the first direction D1 relative to the protrusion 195.

The first end 192 may be at the same position in the conveying direction K as the second end 414, or may be further in the downstream direction D5 relative to the second end 414. The second receiving surface 42 need not have rotational symmetry with the first receiving surface 41 about the axis of symmetry J, and the second protrusion 421 need not have rotational symmetry with the first protrusion 411 about the axis of symmetry J. The second sloped portion 422 need not have rotational symmetry with the first sloped portion 412 about the axis of symmetry J. At least one of the first sloped portion 412 and the second sloped portion 422 of the intersecting surface 400 may be a curved surface. The angle E1 and the angle E2 may be different from each other.

The first sloped portion 412 may be sloped the same amount in the third direction D3 as extending in the downstream direction D5 and in the upstream direction D6, or may be sloped so that the sloping amount relative to the third direction D3 becomes greater as extending in the upstream direction D6. The third protrusion 430 need not include the center 431 of the intersecting surface 400, and may extend only in a part between the edge in the upstream direction D6 of the intersecting surface 400 and the edge in the downstream direction D5 of the intersecting surface 400. The shape of the third protrusion 430 in a bottom view may be modified as appropriate to a rectangular shape, a trapezoidal shape, or an elliptical shape, for example.

The modifications described above may be combined as appropriate as long as any contradiction is avoided. In addition to combinations exemplified in the scope of the claims, the applicant intends to obtain patent rights for any combination of the embodiment and the modifications thereof that do not depart from the scope of the present disclosure and that do not contain any contradiction.

<Remarks>

In the above embodiment and the modifications, the cutting device 2 is an example of the "cutting device"; the blade receiver 40 is an example of the "blade receiver"; the first receiving surface 41 is an example of the "first receiving surface"; the cutting blade 51 is an example of the "cutting blade"; the cutting position of the cutting blade 51 is an example of the "cutting position"; the tape M is an example of the "tape"; the conveying direction K is an example of the "conveying direction"; the normal position of the cutting blade 51 is an example of the "normal position"; the support member 52 is an example of the "support member"; the path-forming part 19 is an example of the "path-forming part"; the first end 192 is an example of the "first end"; the first direction D1 is an example of the "first direction"; the second end 414 is an example of the "second end"; the third end 53 is an example of the "third end"; the second direction D2 is an example of the "second direction"; the intersection point P1 is an example of the "intersection point"; the first virtual line L1 is an example of the "first virtual line"; the second virtual line L2 is an example of the "second virtual line"; the up-down direction is an example of the "direction orthogonal to the first direction"; the first side surface 410 is an example of the "first side surface"; the first protrusion 411 is an example of the "first protrusion"; the intersecting surface 400 is an example of the "intersecting surface"; the second receiving surface 42 is an example of the "second receiving surface"; the axis of symmetry J is an example of the "axis of symmetry"; the center 431 is an example of the "center"; the second protrusion 421 is an example of the "second protrusion"; the first posture of the blade receiver 40 is an example of the "first posture"; the second posture of the blade receiver 40 is an example of the "second posture"; the first sloped portion 412 is an example of the "first sloped portion"; the third direction D3 is an example of the "third direction"; the third protrusion 430 is an example of the "third protrusion"; the fourth direction D4 is an example of the "fourth direction"; the first protruding surface 413 is an example of the "first protruding surface"; the second sloped portion 422 is an example of the "second sloped portion"; the second protruding surface 423 is an example of the "second protruding surface"; the printing device 1 is an example of the "printing device"; the printing head 26 is an example of the "printing head"; and the conveying unit 36 is an example of the "conveying unit".

What is claimed is:

1. A cutting device comprising:

a blade receiver having a first receiving surface;

a cutting blade movable between:

a cutting position in which the cutting blade cuts, at a position between the cutting blade and the first receiving surface, a tape conveyed in a conveying direction along the first receiving surface; and a normal position in which the cutting blade is in separation from the first receiving surface;

a support member supporting the cutting blade so that the cutting blade is movable between the cutting position and the normal position; and a path-forming part adjacent to the support member and positioned further downstream in the conveying direction relative to the support member, the path-forming part forming a conveying path of the tape, wherein the path-forming part has a first end, the first end being both an upstream end in the conveying direction of the path-forming part and an end in a first direction of the path-forming part, the first direction being a direction from the blade receiver toward the cutting blade, the first direction being orthogonal to the first receiving surface, wherein the first receiving surface has a second end, the second end being a downstream end in the conveying direction of the first receiving surface, and wherein the first end is positioned further upstream in the conveying direction relative to the second end and is positioned further in a second direction relative to the second end, the second direction being opposite the first direction.

2. The cutting device according to claim 1, wherein the blade receiver further has:

a first side surface on a downstream side in the conveying direction; and a first protrusion protruding toward the downstream side in the conveying direction from the first side surface, the first protrusion constituting a part of the first receiving surface, and wherein the second end is a downstream end in the conveying direction of the first protrusion.

3. The cutting device according to claim 1, wherein the blade receiver further has:

a first side surface on a downstream side in the conveying direction;

a first protrusion protruding toward the downstream side in the conveying direction from the first side surface, the first protrusion constituting a part of the first receiving surface;

an intersecting surface connected to both the first receiving surface and the first side surface, the intersecting surface intersecting both the first receiving surface and the first side surface;

a second receiving surface rotationally symmetrical to the first receiving surface with respect to an axis of symmetry, the axis of symmetry being orthogonal to the conveying direction, the axis of symmetry being parallel to the first receiving surface, the axis of symmetry passing through a center of the intersecting surface; and a second protrusion rotationally symmetrical to the first protrusion with respect to the axis of symmetry, and wherein the blade receiver is mountable in the cutting device both in:

a first posture in which the first receiving surface faces the cutting blade; and a second posture in which the second receiving surface faces the cutting blade.

4. The cutting device according to claim 1, wherein the blade receiver further has:

a first side surface on a downstream side in the conveying direction; and an intersecting surface connected to both the first receiving surface and the first side surface, the intersecting surface intersecting both the first receiving surface and the first side surface, the intersecting surface including:

a first sloped portion sloped in a third direction away from a center of the intersecting surface in the first direction, the third direction being a direction from the intersecting surface toward the first receiving surface, the third direction being orthogonal to the conveying direction and parallel to the first receiving surface.

5. The cutting device according to claim 4, wherein the first sloped portion is sloped so that an amount that the first sloped portion is sloped relative to the third direction becomes greater as extending toward the downstream side in the conveying direction.

6. The cutting device according to claim 5, wherein the blade receiver includes:

a third protrusion protruding from the intersecting surface in a fourth direction opposite the third direction, the third protrusion extending from an upstream end in the conveying direction of the intersecting surface to a downstream end in the conveying direction of the intersecting surface, the third protrusion including the center of the intersecting surface, the third protrusion having:

a first protruding surface, the first protruding surface being a side surface in the first direction of the third protrusion, the first protruding surface being sloped in the third direction away from the center of the intersecting surface in the first direction.

7. The cutting device according to claim 6, wherein the blade receiver further has:

a second receiving surface rotationally symmetrical to the first receiving surface with respect to an axis of symmetry, the axis of symmetry being orthogonal to the conveying direction, the axis of symmetry being parallel to the first receiving surface, the axis of symmetry passing through the center of the intersecting surface; and a second sloped portion rotationally symmetrical to the first sloped portion with respect to the axis of symmetry, wherein the third protrusion further has:

a second protruding surface rotationally symmetrical to the first protruding surface with respect to the axis of symmetry, and wherein the blade receiver is mountable in the cutting device both in:

a first posture in which the first receiving surface faces the cutting blade; and a second posture in which the second receiving surface faces the cutting blade.

8. A printing device comprising:

a printing head configured to perform printing on a tape;

a conveying unit configured to convey the tape in a conveying direction; and a cutting device configured to cut the tape, the cutting device comprising:

a blade receiver having a first receiving surface;

a cutting blade movable between:

a cutting position in which the cutting blade cuts, at a position between the cutting blade and the first receiving surface, the tape conveyed in the conveying direction along the first receiving surface; and a normal position in which the cutting blade is in separation from the first receiving surface;

a support member supporting the cutting blade so that the cutting blade is movable between the cutting position and the normal position; and a path-forming part adjacent to the support member and positioned further downstream in the conveying direction relative to the support member, the path-forming part forming a conveying path of the tape, wherein the path-forming part has a first end, the first end being both an upstream end in the conveying direction of the path-forming part and an end in a first direction of the path-forming part, the first direction being a direction from the blade receiver toward the cutting blade, the first direction being orthogonal to the first receiving surface, wherein the first receiving surface has a second end, the second end being a downstream end in the conveying direction of the first receiving surface, and wherein the first end is positioned further upstream in the conveying direction relative to the second end and is positioned further in a second direction relative to the second end, the second direction being opposite the first direction.

* * * * *